US008106887B2

(12) United States Patent
Park et al.

(10) Patent No.: US 8,106,887 B2
(45) Date of Patent: Jan. 31, 2012

(54) DISPLAY APPARATUS AND METHOD FOR MOBILE TERMINAL

(75) Inventors: A-Reum Park, Seoul (KR); Mi-Jun Yoo, Seoul (KR); Ka-Eun Lee, Seoul (KR); Yun-Hwan Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 931 days.

(21) Appl. No.: 11/226,692

(22) Filed: Sep. 13, 2005

(65) Prior Publication Data

US 2006/0211454 A1    Sep. 21, 2006

(30) Foreign Application Priority Data

Sep. 14, 2004  (KR) .................. 10-2004-0073500

(51) Int. Cl.
*G09G 5/00* (2006.01)
(52) U.S. Cl. ........ 345/169; 345/168; 345/173; 345/174; 455/556.2; 455/566; 361/679.28
(58) Field of Classification Search ................. 345/168, 345/169, 173, 174; 455/566, 556.2; 361/679.21, 361/679.26–679.29, 679.3, 679.55–679.56, 361/679.09
See application file for complete search history.

(56) References Cited

U.S. PATENT DOCUMENTS

| | | | | |
|---|---|---|---|---|
| 6,073,187 A * | 6/2000 | Jacobs et al. | ..................... | 710/14 |
| 6,107,988 A * | 8/2000 | Phillipps | ........................ | 345/156 |
| 6,297,945 B1 * | 10/2001 | Yamamoto | ............... | 361/679.04 |
| 6,744,623 B2 * | 6/2004 | Numano et al. | ......... | 361/679.27 |
| 6,792,480 B2 * | 9/2004 | Chaiken et al. | ................. | 710/14 |
| 6,941,160 B2 * | 9/2005 | Otsuka et al. | ................. | 455/566 |
| 7,016,704 B2 * | 3/2006 | Pallakoff | ........................ | 455/566 |
| 7,035,665 B2 * | 4/2006 | Kido et al. | ..................... | 455/566 |
| 7,054,669 B2 * | 5/2006 | Ito | ................................. | 455/566 |
| 7,196,676 B2 * | 3/2007 | Nakamura et al. | ............. | 345/1.1 |
| 7,466,994 B2 * | 12/2008 | Pihlaja et al. | ..................... | 455/566 |
| 2001/0003707 A1 * | 6/2001 | Moriya | .......................... | 455/566 |
| 2002/0021258 A1 | 2/2002 | Koenig | | |
| 2003/0081006 A1 * | 5/2003 | Sheldon et al. | ............... | 345/781 |
| 2003/0119562 A1 * | 6/2003 | Kokubo | .......................... | 455/566 |
| 2003/0211872 A1 | 11/2003 | Meins et al. | | |
| 2004/0067769 A1 * | 4/2004 | King et al. | ................. | 455/556.1 |
| 2005/0083642 A1 * | 4/2005 | Senpuku et al. | .............. | 361/681 |
| 2005/0096082 A1 * | 5/2005 | Chang | ......................... | 455/550.1 |

FOREIGN PATENT DOCUMENTS

| | | |
|---|---|---|
| EP | 1220081 A2 | 12/2001 |
| EP | 1271904 A | 5/2002 |
| EP | 1549067 A | 12/2004 |
| JP | 2002-152328 | 5/2002 |
| JP | 2002-171317 | 6/2002 |

(Continued)

*Primary Examiner* — Lun-Yi Lao
*Assistant Examiner* — Gregory J Tryder
(74) *Attorney, Agent, or Firm* — Lee, Hong, Degerman, Kang & Waimey

(57) ABSTRACT

A display apparatus for a mobile terminal including: an input unit for receiving a user's instruction; a controller for simultaneously executing two or more tasks and transferring the received instruction to at least one display unit; a first display unit for performing displaying according to the received instruction; and a second display unit placed at a position where a user can view it together with the first display unit. The mobile terminal can simultaneously process a plurality of tasks through a plurality of display units to allow the user to perform multitasking substantially.

38 Claims, 22 Drawing Sheets

FOREIGN PATENT DOCUMENTS

| | | |
|---|---|---|
| JP | 2003-204378 | 7/2003 |
| JP | 2003-209609 | 7/2003 |
| JP | 2003-283608 | 10/2003 |
| JP | 2004-180022 | 6/2004 |
| KR | 20030056072 | 7/2003 |
| KR | 20030056443 | 7/2003 |
| KR | 20040039530 | 5/2004 |
| KR | 1020040044829 A | 5/2004 |
| WO | WO 9848550 A | 10/1998 |
| WO | WO 03-077098 A1 | 9/2003 |
| WO | WO 3077097 A1 * | 9/2003 |
| WO | WO 03077097 A1 | 9/2003 |

* cited by examiner

FIG. 3B
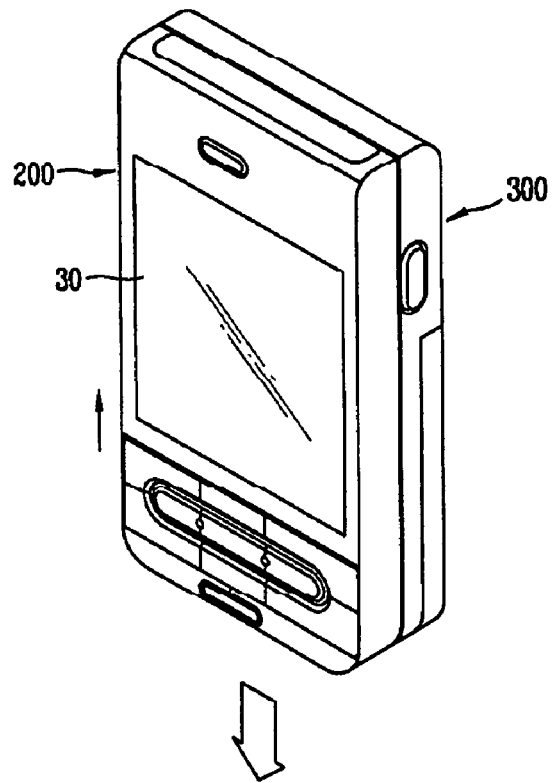
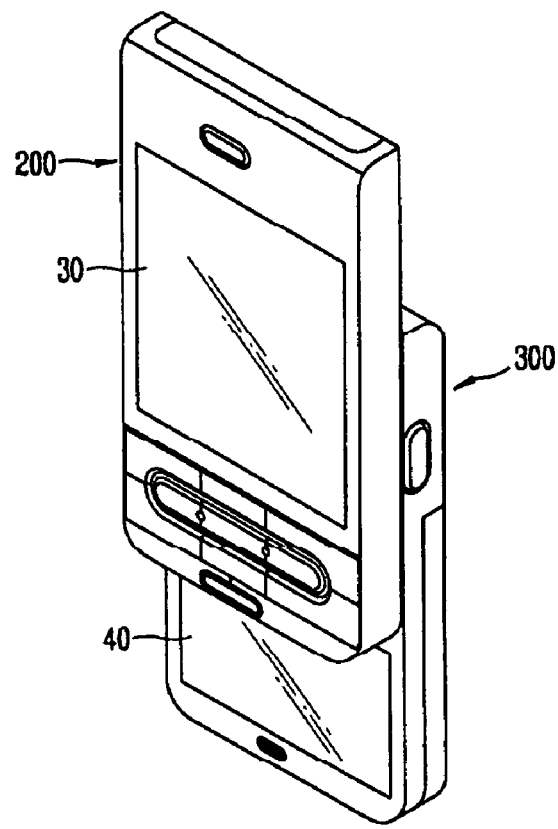

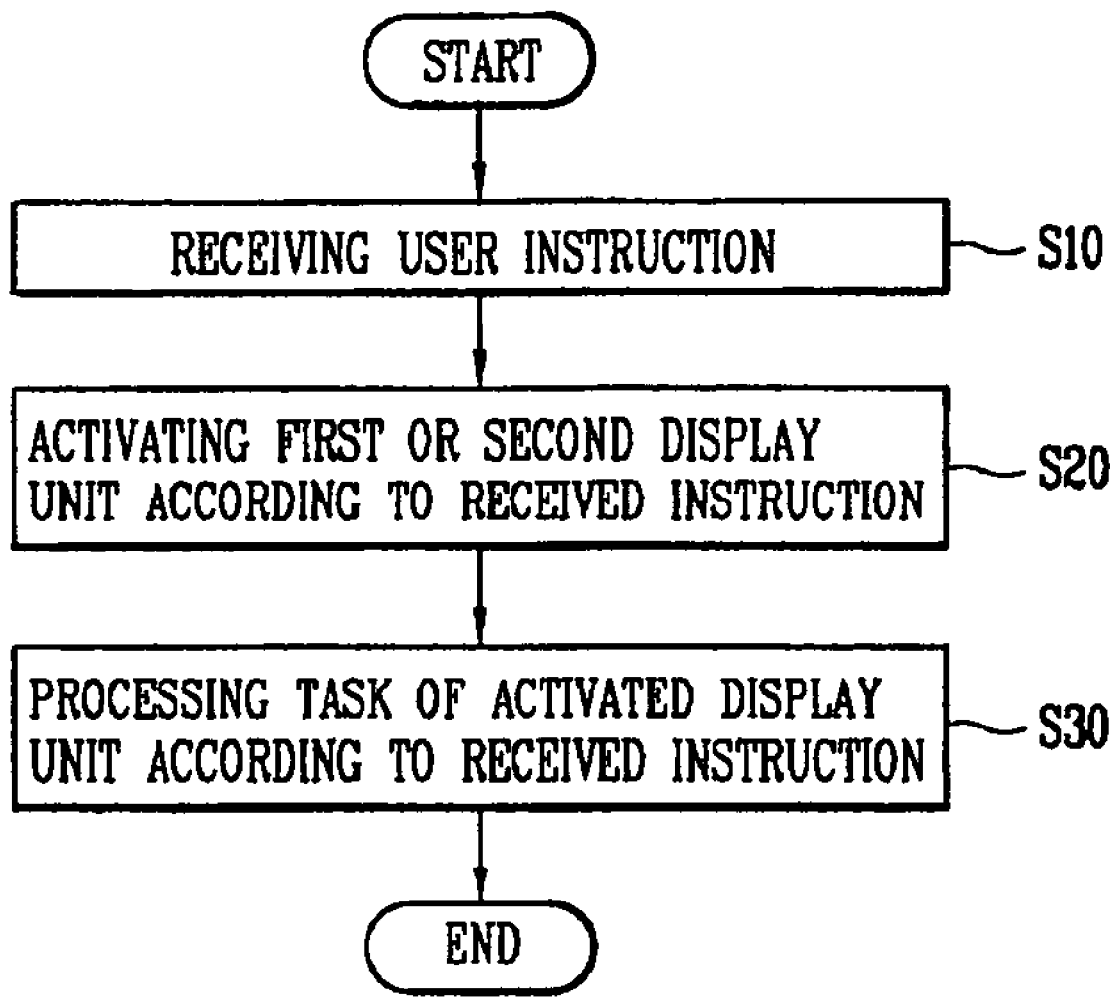

DISPLAY APPARATUS AND METHOD FOR MOBILE TERMINAL

CROSS REFERENCE TO RELATED APPLICATIONS

Pursuant to 35 U.S.C. §119(a), this application claims the benefit of earlier filing date and right of priority to Korean Application No. 10-2004-73500, filed on Sep. 14, 2004, the contents of which are hereby incorporated by reference herein in their entirety.

BACKGROUND OF THE INVENTION

1. Field of the Invention

The present invention relates to a mobile terminal and, more particularly, to a display apparatus and method for a mobile terminal for supporting multitasking.

2. Description of the Related Art

Initially, mobile terminals were used only for the purpose of voice communications, and with the diversification of their functions, mobile terminals have been developed to provide Internet services and multimedia services as well as voice communications. Furthermore, as small memory chips or a digital image capturing devices are being developed, mobile terminals are evolving into an all-in-one device which can perform the functions of an MP3 player and a digital camera.

With such various functions embedded in mobile terminals, mobile terminals for performing multitasking have been recently developed and are available on the market to consumers.

Multitasking refers to simultaneously executing a plurality of tasks. For example, multitasking-implemented mobile terminals can receive a call or reproduce a music file while performing a short message service (SMS). In addition, the multitasking-implemented mobile terminals can perform data communications using an instant messenger function while reproducing a video file to allow a user to enjoy watching videos.

BRIEF DESCRIPTION OF THE INVENTION

Therefore, an object of the present invention is to provide a display unit of a mobile terminal capable of processing a plurality of tasks through a plurality of screens and its method.

To achieve at least the above objects in whole or in parts, there is provided a display apparatus for a mobile terminal including: an input unit for receiving user instructions; a controller for simultaneously executing two or more tasks and transferring the received instructions to at least one display unit; a first display unit for performing displaying according to the received instructions; and a second display unit located at a position where a user can view it together with the first display unit.

Preferably, the tasks are independent from each other.

Preferably, the first and second display units operate independently.

Preferably, when the received instructions indicate display conversion, the controller changes the tasks of the first and second display units and displays the tasks accordingly.

Preferably, when the received instructions indicate displaying of a list of tasks, the controller displays a list of tasks being currently executed or tasks which can be executed on the first or second display unit.

Preferably, when the received instructions indicate deactivation of a currently activated display unit and activation of a deactivated display unit, the controller suspends an operation of the activated display unit and processes an operation of the deactivated display unit.

Preferably, the mobile terminal is a folder type mobile terminal.

Preferably, the mobile terminal is a slide type mobile terminal.

Preferably, the mobile terminal further includes a display unit selecting means for allowing the user to select the first or the second display unit.

To achieve at least these advantages in whole or in parts, there is further provided a display apparatus for a mobile terminal including: an input unit for receiving user instructions; a controller for simultaneously executing two or more tasks and transferring the instructions received from the user to at least one display unit; and a display unit divided into a plurality of display regions, each display region independently displaying according to the instructions.

Preferably, the mobile terminal further includes a display region selecting unit for allowing the user to select one of the display regions.

To achieve at least these advantages in whole or in parts, there is further provided a display method for a mobile terminal for simultaneously executing at least two or more tasks, including: receiving a user instruction; activating a first or second display unit according to the received instruction; and processing an operation of an activated display unit according to the received instruction.

Preferably, when the mobile terminal executes only one task, the display unit which does not process a task is maintained in a standby state.

Preferably, if the mobile terminal executes two or more tasks, the tasks are displayed on the first and second display units, respectively, according to the user instruction.

Preferably, when the received instruction indicates display switching, the task of the activated display unit and the task of the deactivated display unit are exchanged and displayed.

Preferably, when the received instruction indicates a displaying of a list of tasks, a list of tasks being currently executed or tasks which can be executed are displayed on the activated display unit.

Preferably, when the received instruction indicates deactivation of the activated display unit and activation of the deactivated display unit, the operation of the activated display unit is suspended and the operation of the deactivated display unit is processed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 3A to 3C illustrate exemplary slide type mobile terminals employing the present invention;

FIG. 7 is a flow chart illustrating exemplary processes of a display method for the mobile terminal in accordance with the present invention;

DETAILED DESCRIPTION OF THE PREFERRED EMBODIMENTS

Some embodiments of the present invention will now be described with reference to the accompanying drawings.

Figure 1:
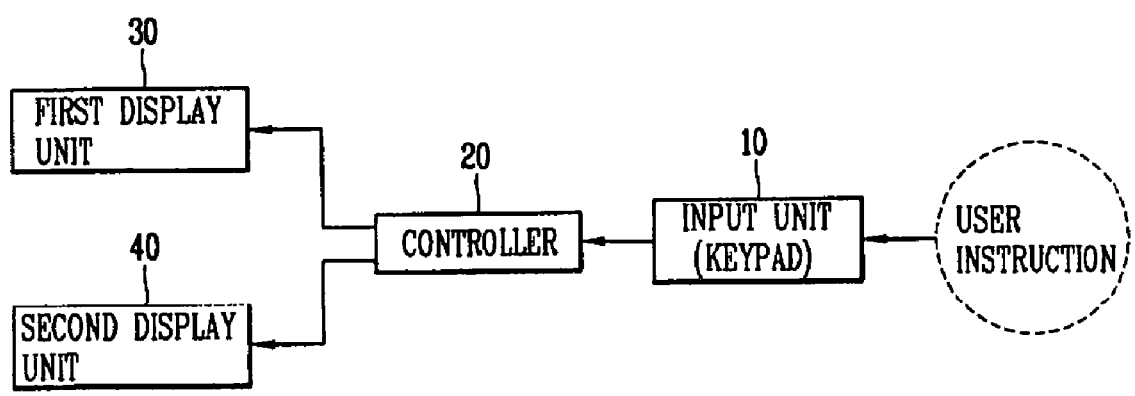
FIG. 1 shows the construction of an exemplary display apparatus for a mobile terminal in accordance with the present invention.

FIG. 1 shows the construction of an exemplary display apparatus for a mobile terminal in accordance with the present invention.

As shown in FIG. 1, a mobile terminal 100 can include an input unit (e.g., key pad) 10 for receiving an instruction of a user; a controller 20 for simultaneously performing two or more tasks and transferring the received instruction of the user to display units 30 and 40; a first display unit 30 for performing displaying according to the instruction; and a second display unit 40 positioned to be simultaneously viewed together with the first display unit 30 and performing displaying according to the instruction.

FIGS. 2 to 6 show various exemplary types of mobile terminals to which the present invention can be applicable.

FIGS. 2A to 2F illustrate exemplary folder type mobile terminals employing the present invention.

As for the basic structure of the folder type mobile terminals as shown in FIGS. 2A to 2F, the mobile terminals can basically include a first body 200, a second body 300, a first display unit 30, a second display unit 40, and a hinge part 400 for allowing one body (e.g., a second body) of the mobile terminal to be rotated with respect to the other body (e.g., a first body).

The folder type mobile terminals of FIGS. 2A to 2F can be divided into mobile terminals whose body (first or second body) can be rotated in a horizontal direction or mobile terminals whose body can be rotated in a vertical direction.

Figure 2A:
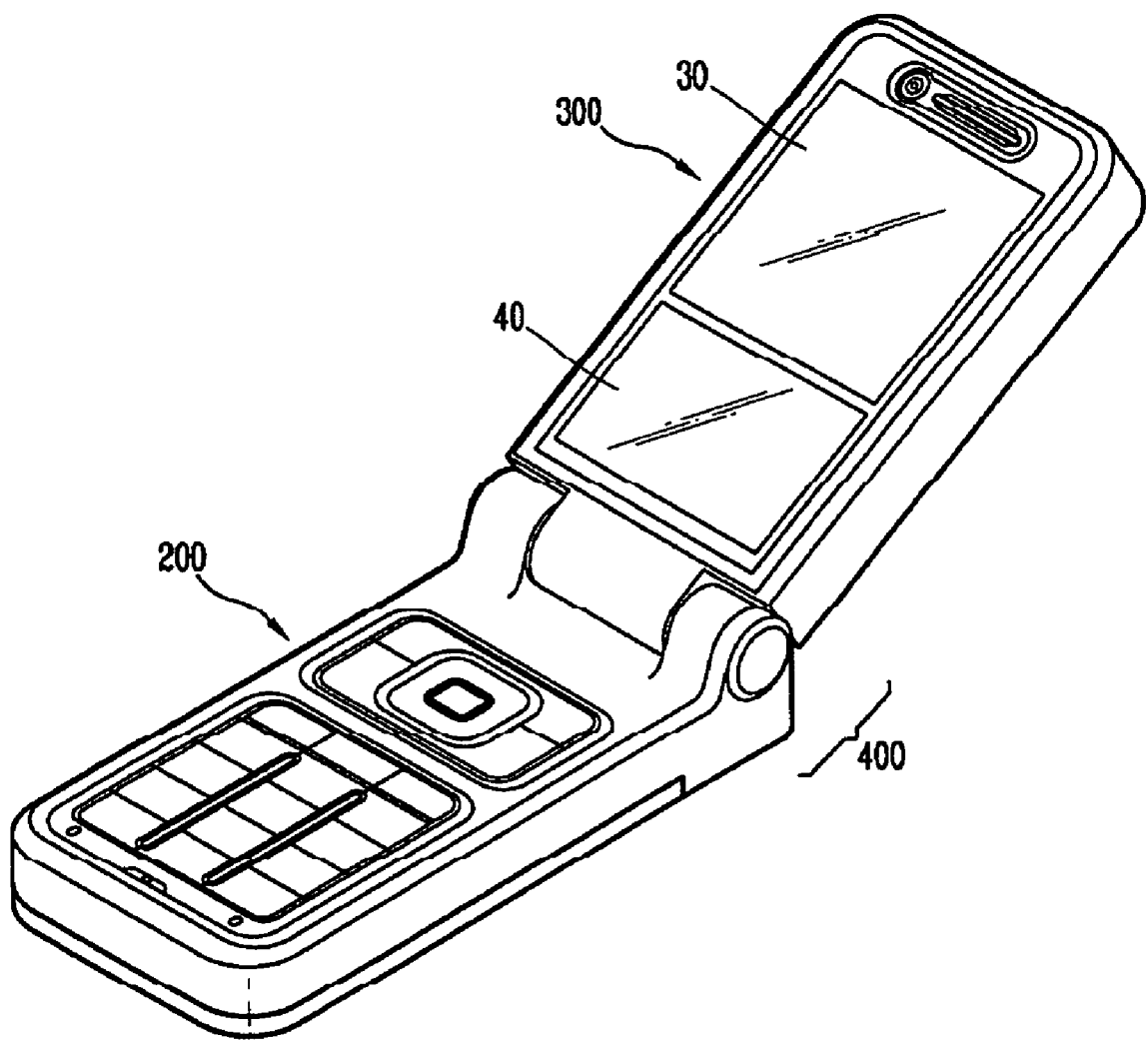
FIGS. 2A to 2F illustrate exemplary folder type mobile terminals employing the present invention.
Figure 2B:
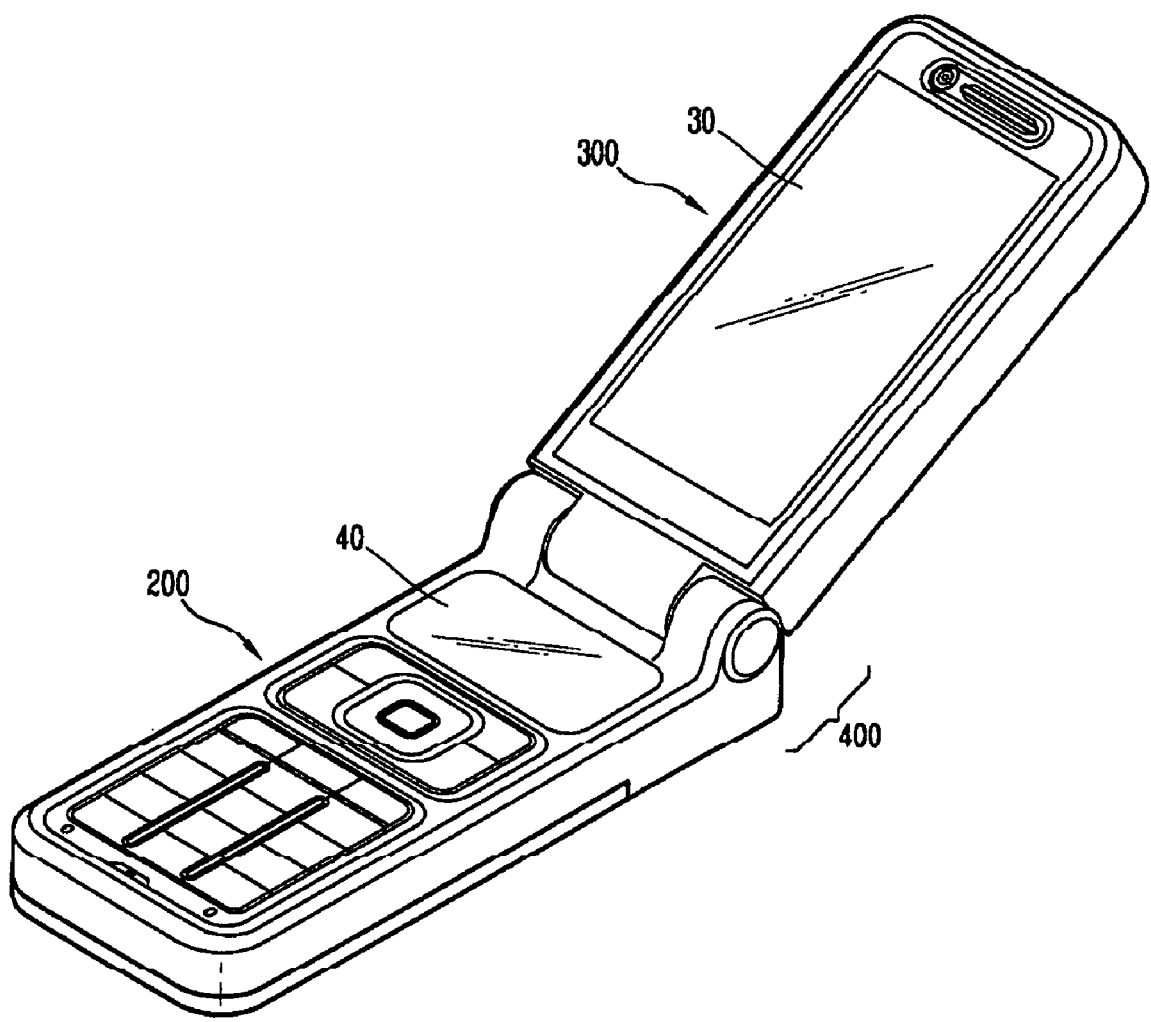
Figure 2C:
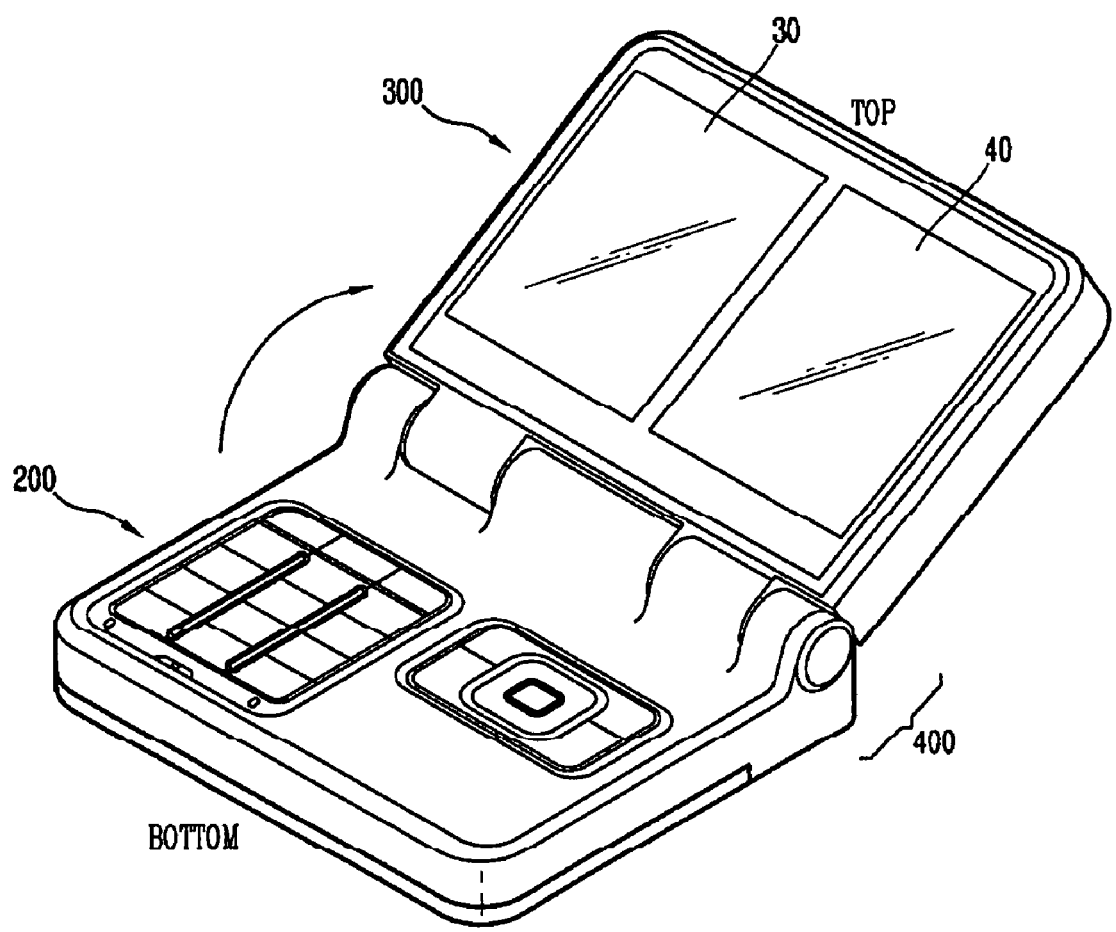
Figure 2D:
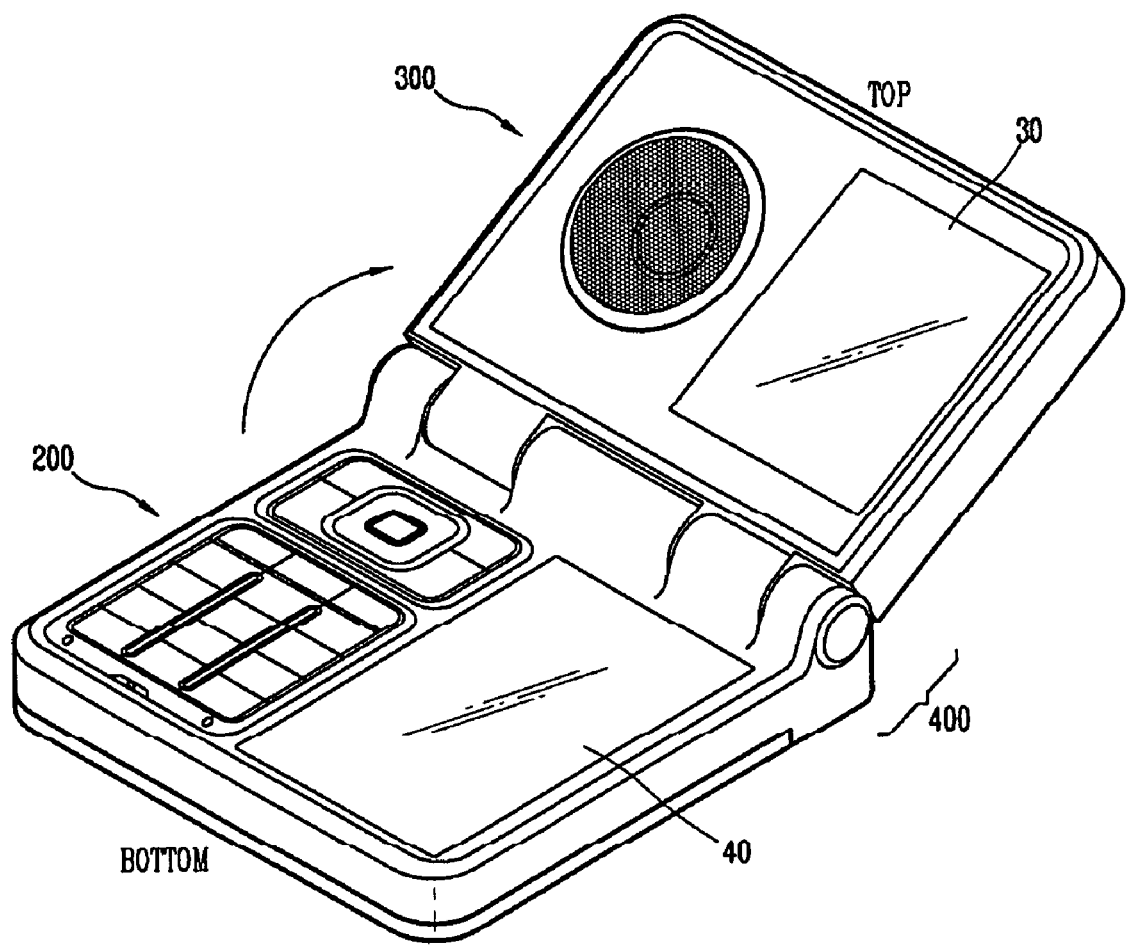

FIGS. 2A to 2D show exemplary folder type mobile terminals whose body is rotated in the vertical direction. As shown in FIGS. 2A and 2C, the folder type mobile terminals can be formed such that the first and second display units 30 and 40 can be attached to (formed on) one body (first or second body), or as shown in FIGS. 2B and 2D, the first and second display units 30 and 40 can be attached to (formed on) the first and second bodies 200 and 300, respectively.

Figure 2E:
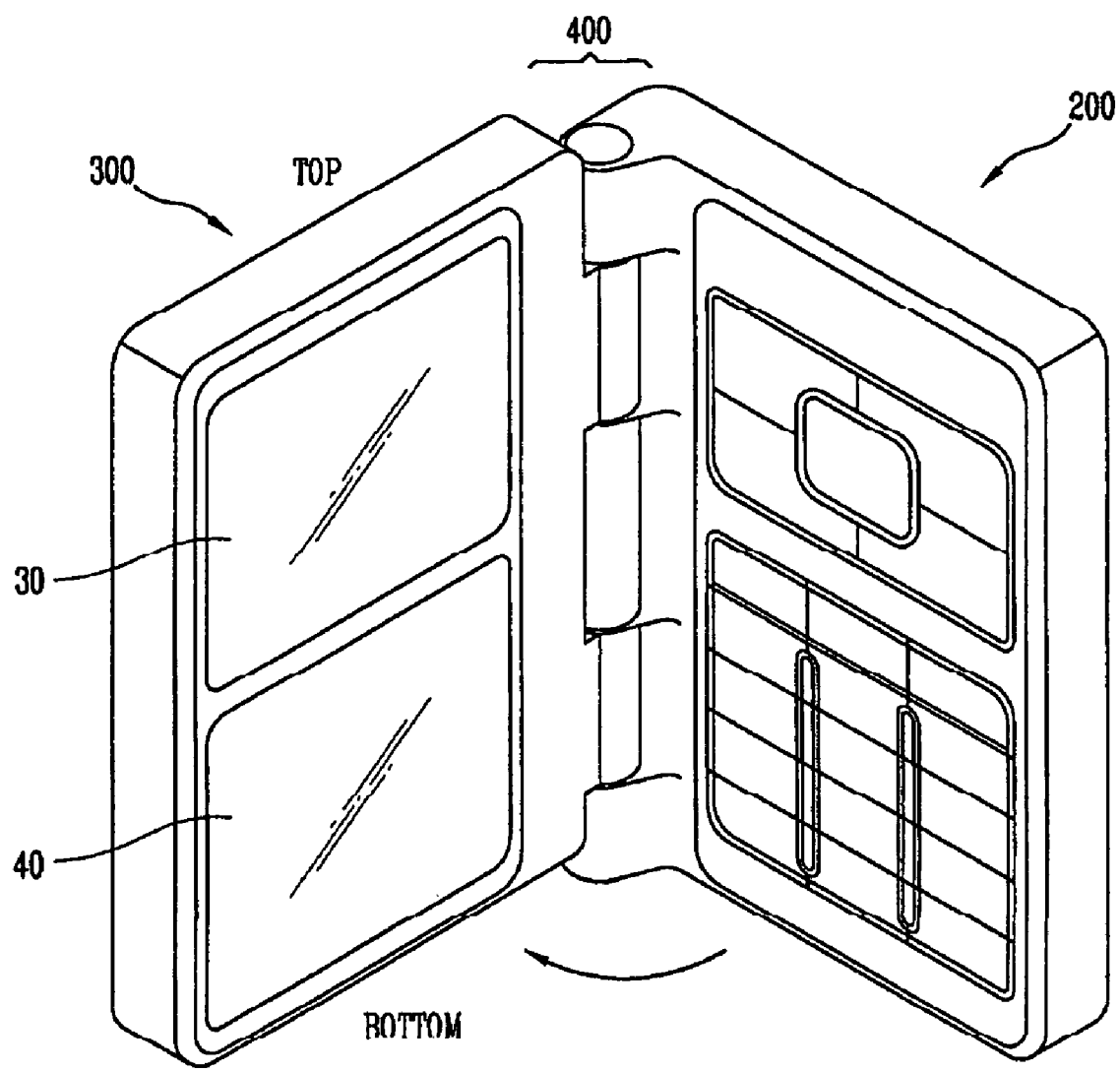
Figure 2F:
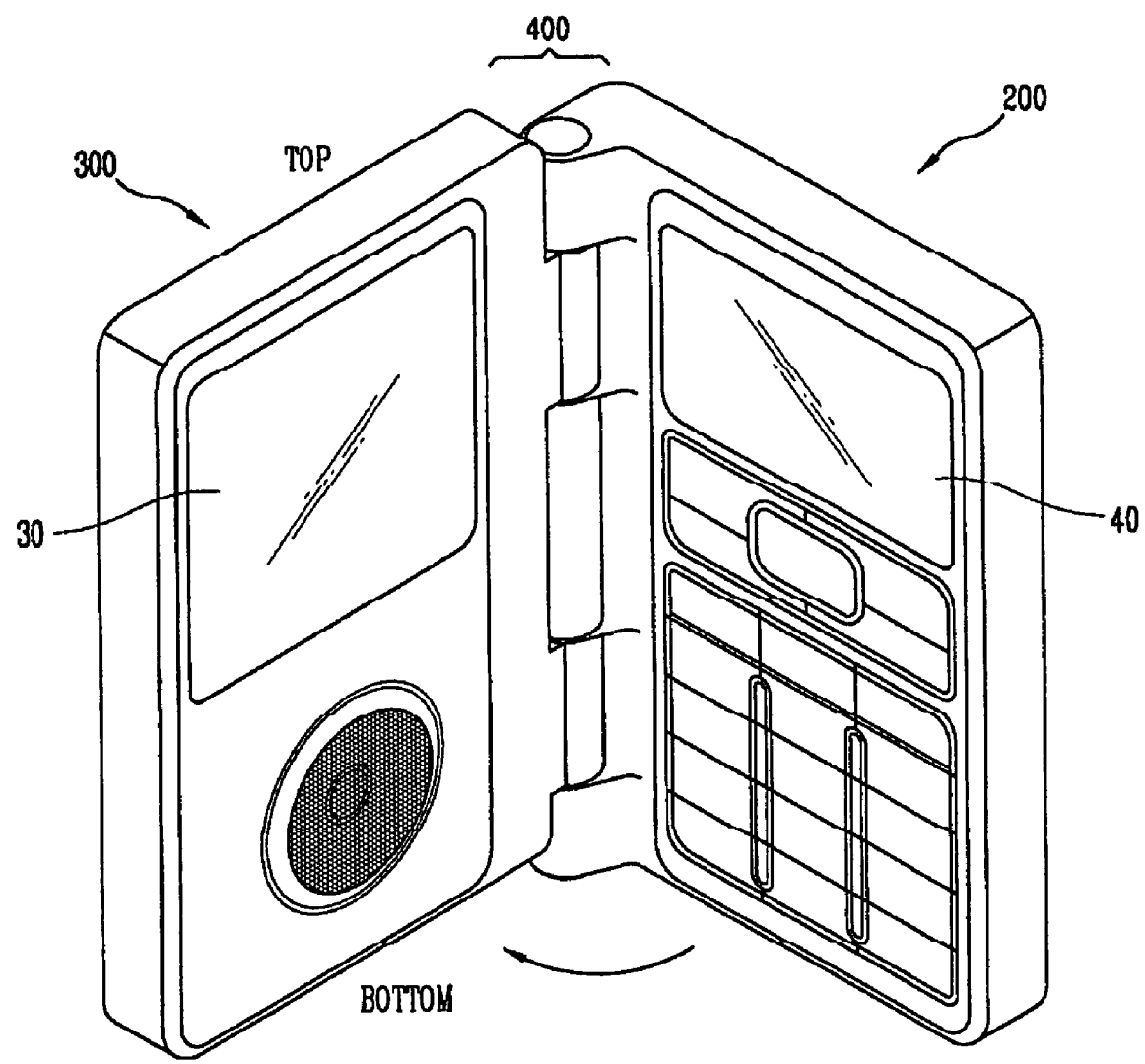

FIGS. 2E and 2F show exemplary folder type mobile terminals whose body is rotated in the horizontal direction. As shown in FIG. 2E, the first and second display units 30 and 40 can be attached to (formed on) one body (first or second body), or as shown in FIG. 2F, the first and second display units 30 and 40 can be attached to (formed on) the first and second body 200 and 300, respectively.

Figure 3A:
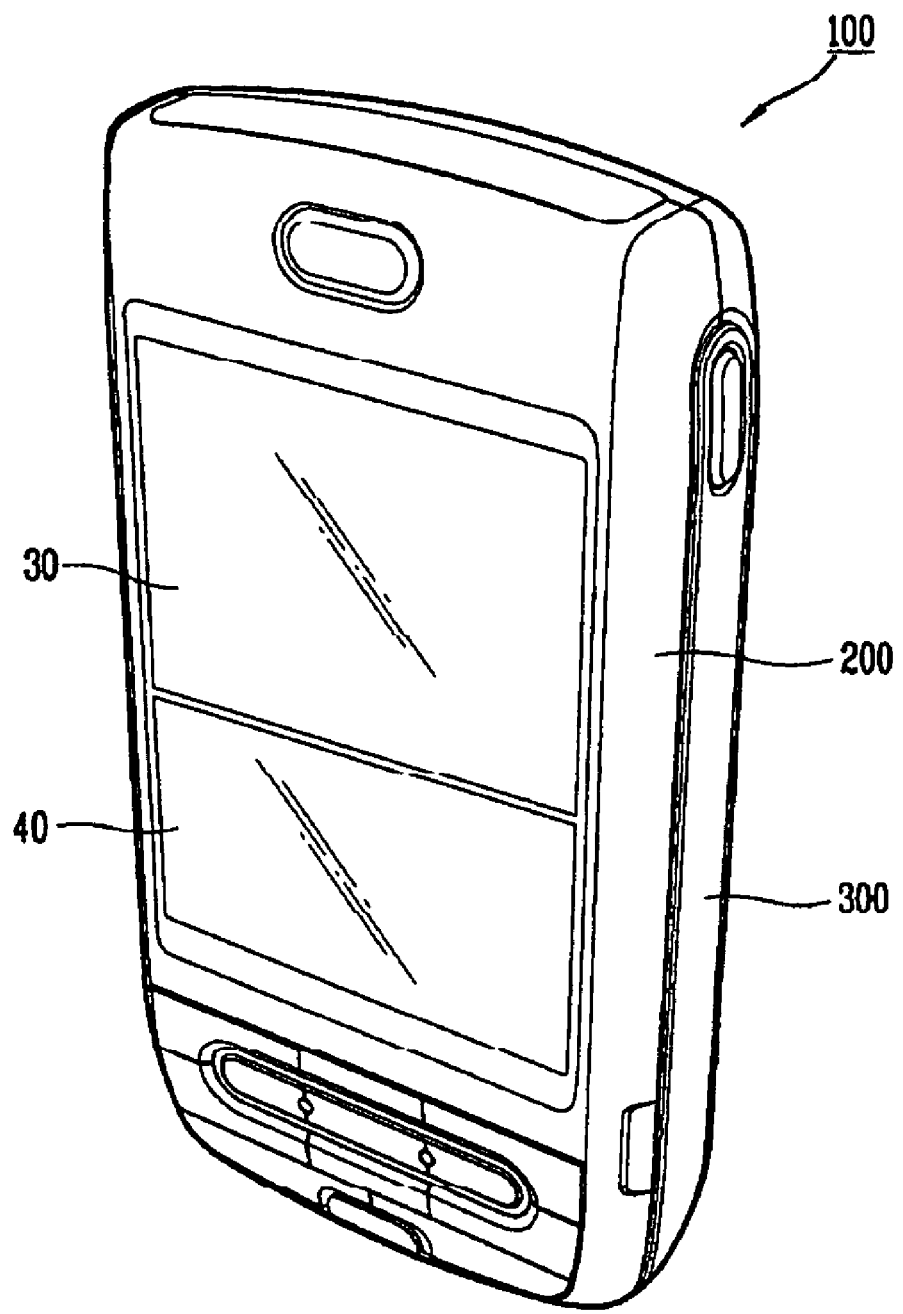
Figure 3C:
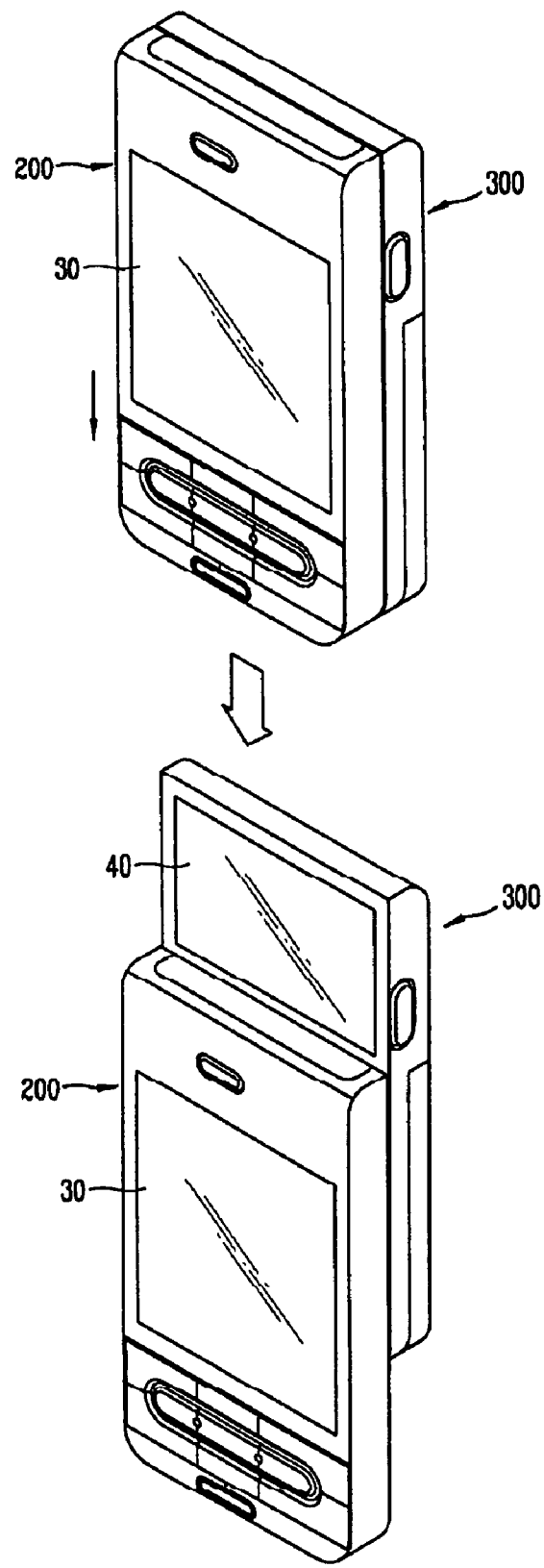

FIGS. 3A to 3C illustrate exemplary slide type mobile terminals employing the present invention.

As for the basic structure of the slide type mobile terminals as shown in FIGS. 3A to 3C, the mobile terminals can basically include a first body 200, a second body 300, a first display unit 30, a second display unit 40, and a sliding part (not shown) for pushing up or down one body (e.g., the second body) with respect to the other body (e.g., the first body).

As shown in FIG. 3A, the first and second display units 30 and 40 can be all attached to (formed on) the first body 200 of the slide type mobile terminal, or as shown in FIGS. 3B and 3C, the first and second display units 30 and 40 can be separately attached to (formed on) the first and second bodies 200 and 300 of the slide type mobile terminal.

In the slide type mobile terminal as shown in FIG. 3B, the first display unit 30 is provided on the first body 200 and the second display unit 40 is provided at a lower portion of the second body 300, so that when the user pushes up the second body 300, the second display unit 40 can be revealed.

In the slide type mobile terminal as shown in FIG. 3C, the first display unit 30 is provided on the first body 200 and the second display unit 40 is provided at an upper portion of the second body 300, so that when the user pushes down the first body 200, the second display unit 40 can be revealed.

Figure 4:
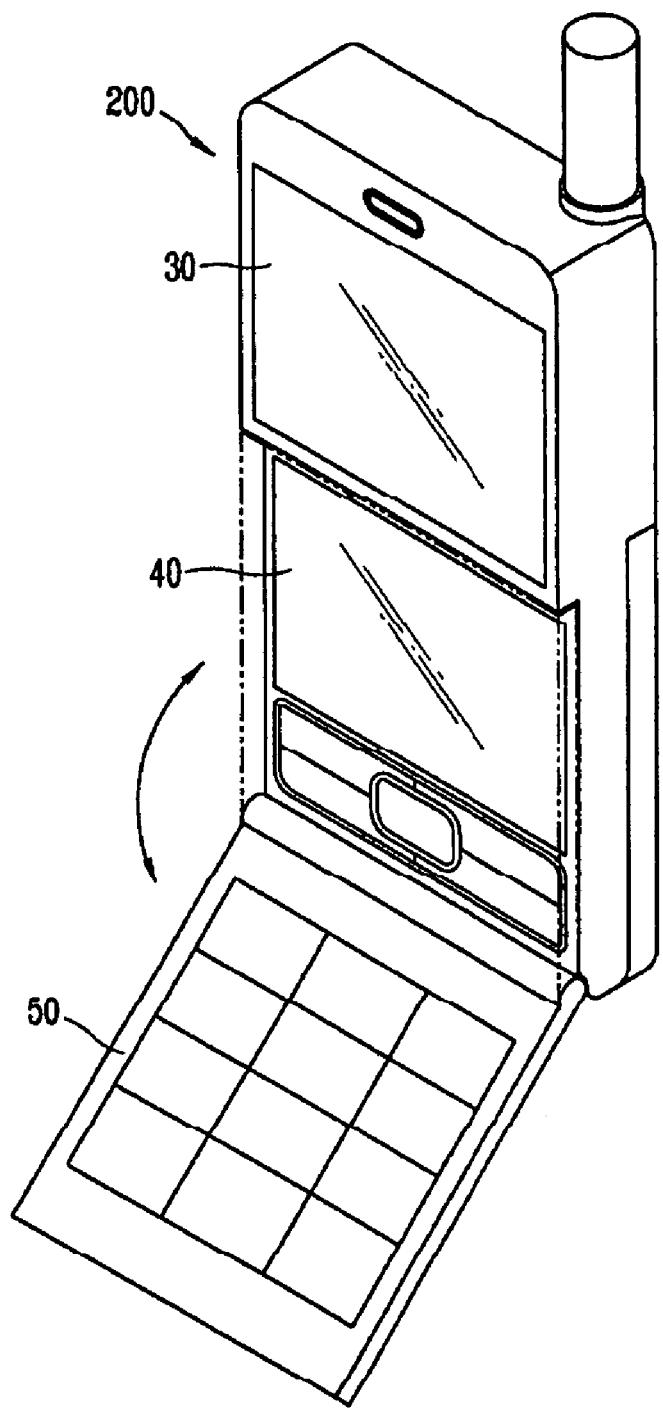
FIG. 4 shows an example of a flip type mobile terminal employing the present invention.

FIG. 4 shows an example of a flip type mobile terminal employing the present invention.

As shown in FIG. 4, the flip-type mobile terminal includes a first display unit 30, a second display unit 40, a body 200 and a cover part 50 covering a portion of the body 200.

The flip type mobile terminal has the second display unit 40 at a lower portion of the body 200, so that when the user opens the cover part 50, the second display unit 40 can be revealed.

Figure 5:
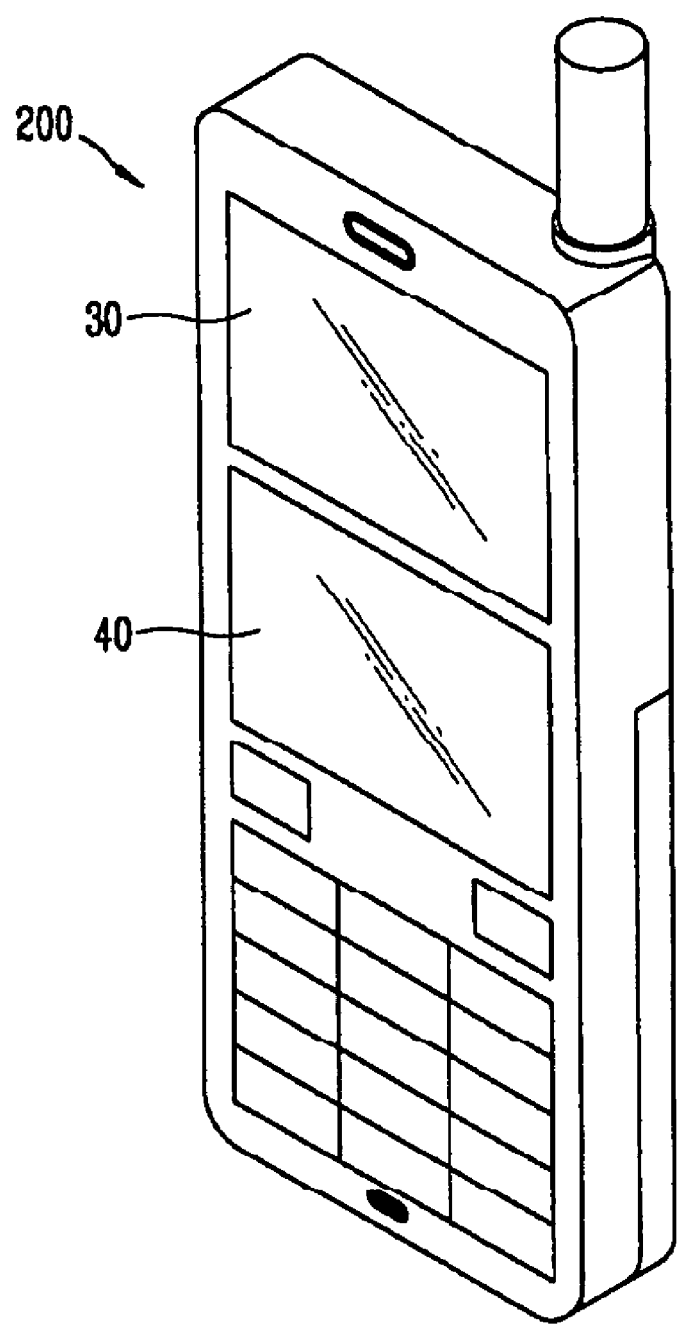
FIG. 5 shows an example of a bar-type mobile terminal employing the present invention.

FIG. 5 shows an example of a bar-type mobile terminal employing the present invention.

As shown in FIG. 5, the bar-type mobile terminal includes two display units 30 and 40, and also can be implemented to have only one display unit in appearance. Namely, a screen is divided into two (first and second display regions) or more regions, and each region can independently perform displaying.

Providing only one display unit having a plurality of regions, instead of the two separate display units 30 and 40, to the mobile terminal can be applied to the above-mentioned folder type mobile terminal, the slide type mobile terminal and the flip type mobile terminal in the same manner.

Figure 6A:
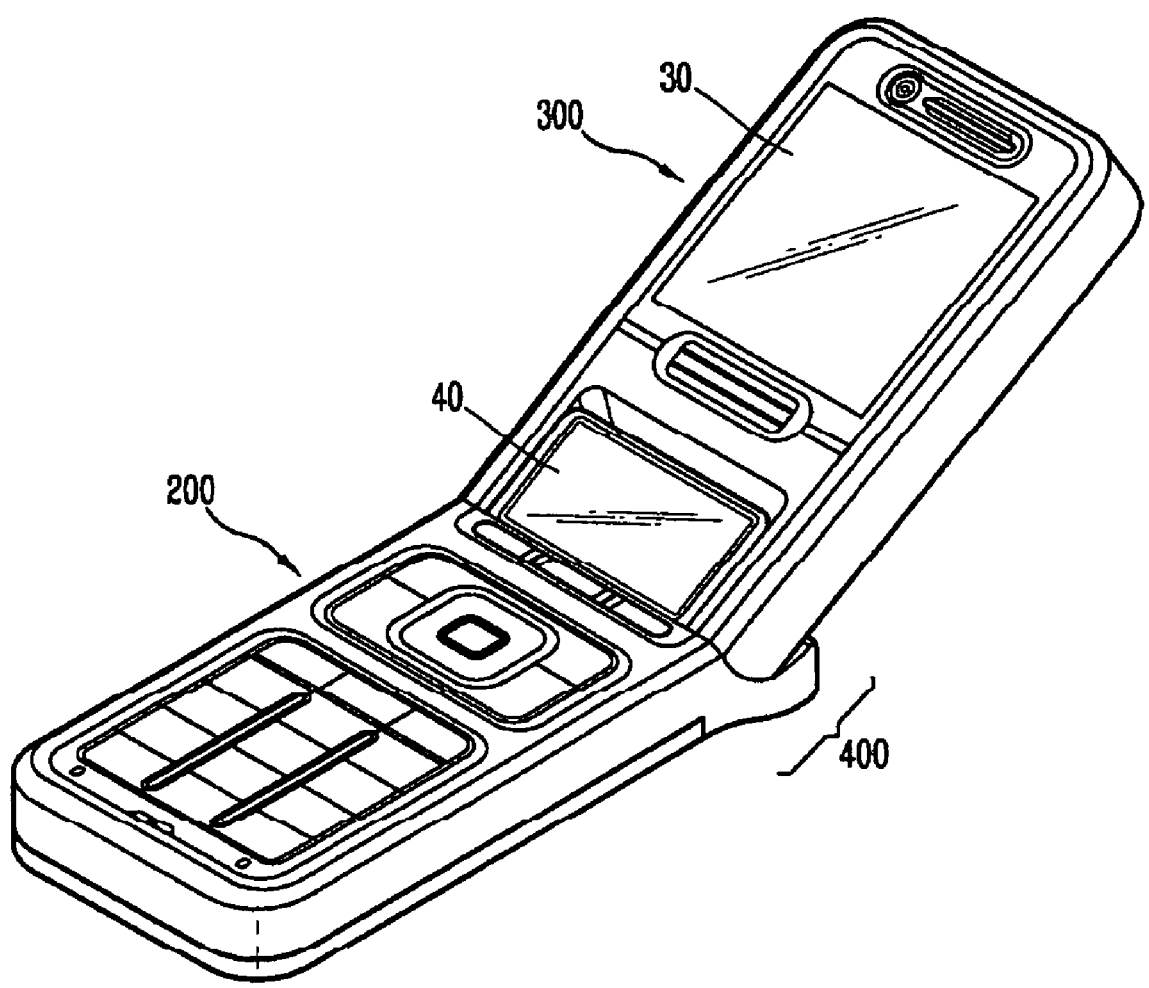
FIGS. 6A to 6C show other examples of the folder type mobile terminal employing the present invention.
Figure 6B:
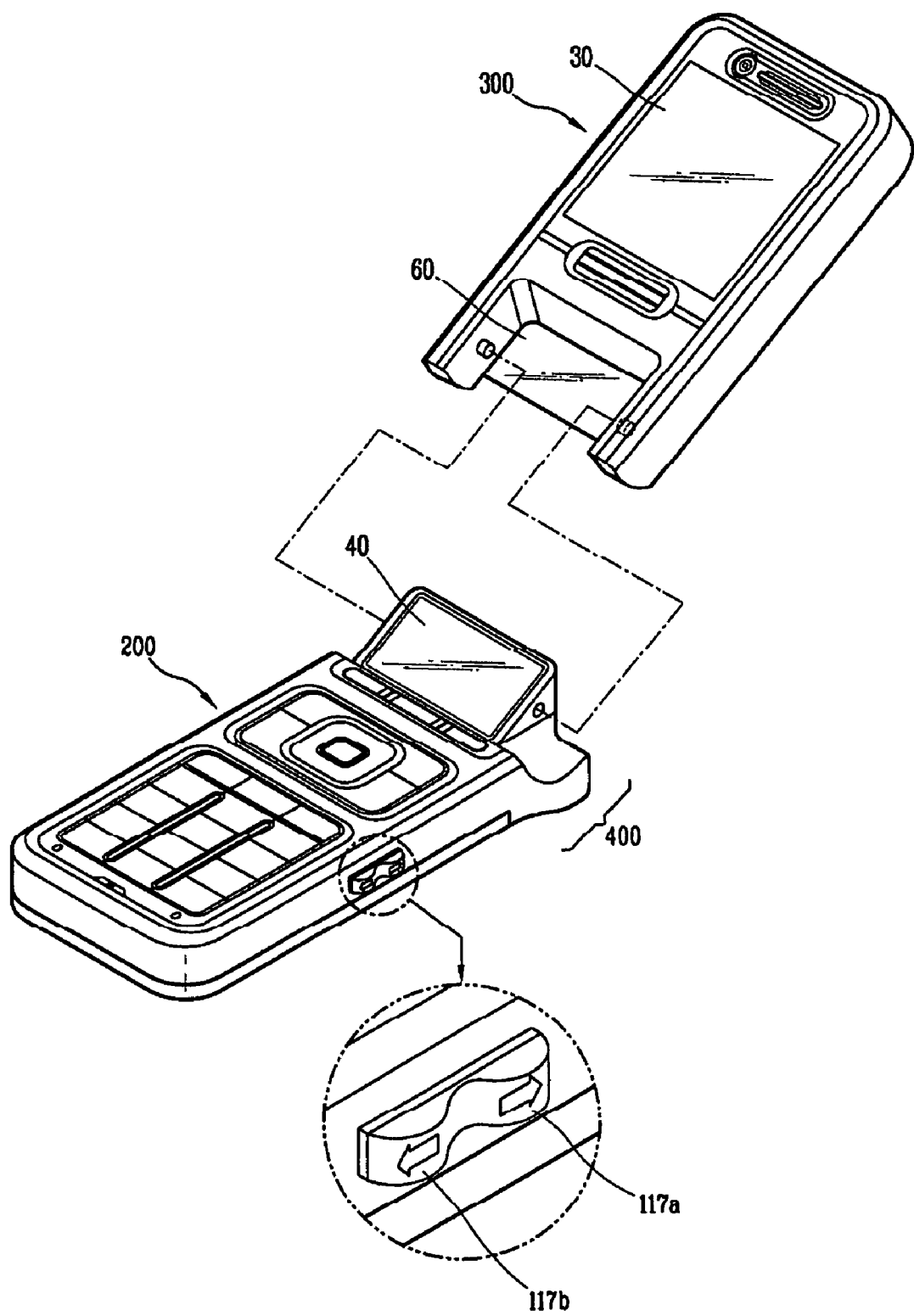
Figure 6C:
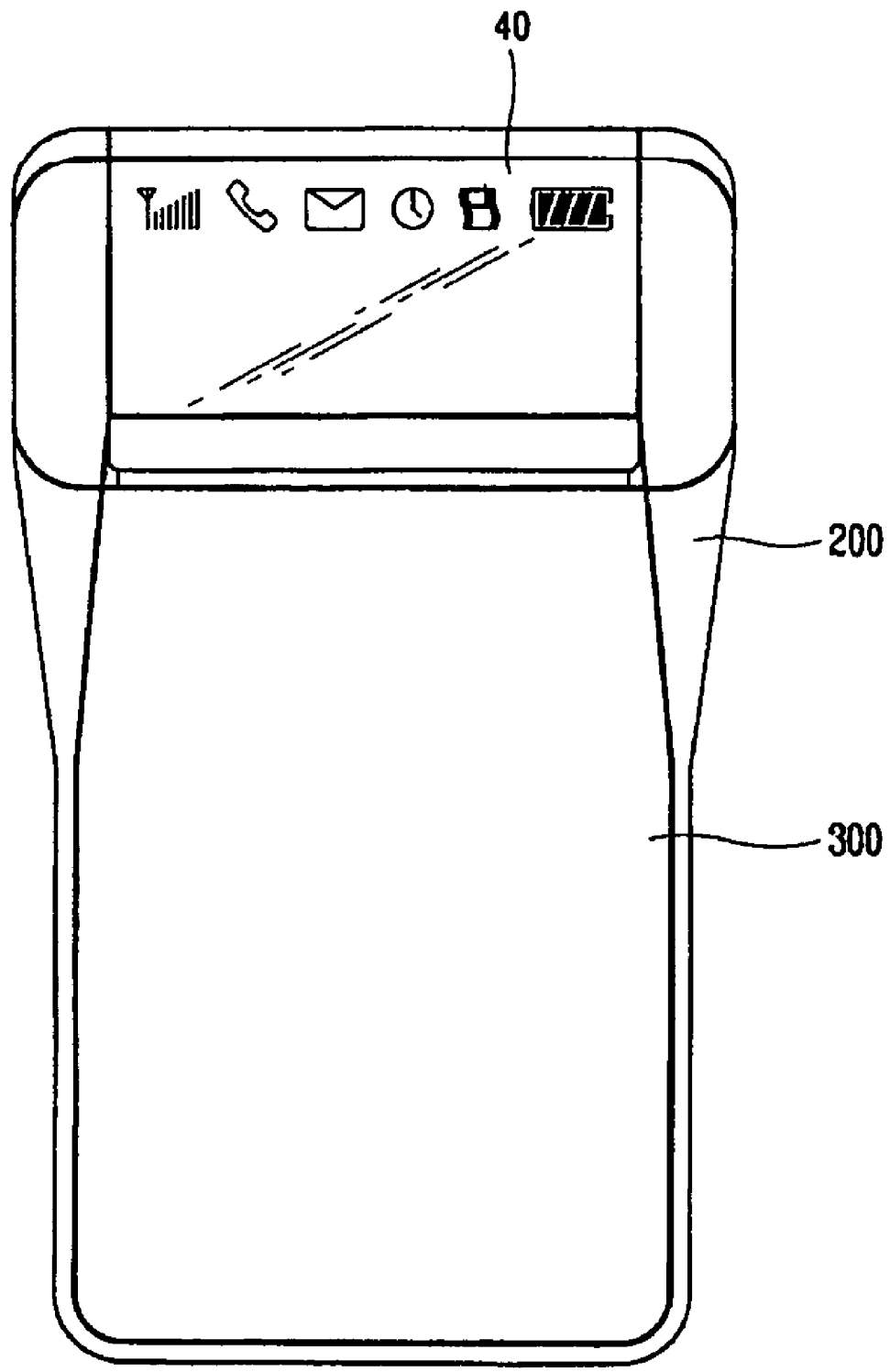

FIGS. 6A to 6C show other examples of the folder type mobile terminal employing the present invention. Specifically, this folder type mobile terminal is constructed such that, with the mobile terminal closed, namely, when two bodies of the mobile terminal are overlapping, the second display unit 40 is exposed.

As for the basic structure of the folder type mobile terminal as shown in FIGS. 6A to 6C, the mobile terminal includes a first body 200, a second body 300, a first display unit 30, a second display unit 40, a hinge part 400 for allowing one body (e.g., a second body) of the mobile terminal to be rotated with respect to the other body (e.g., a first body), and a transparent protection window 60 for protecting the second display unit 40 from external impacts or scratches in a state that the first body 200 and the second body 300 overlap.

As shown in FIG. 6B, the second body 300 is constructed such that a space for receiving the second display unit 40 is formed corresponding to a shape of the second display unit 40 to expose the second display unit in a state that the mobile terminal 100 is closed.

FIG. 6B is an exploded view of the mobile terminal in FIG. 6A and FIG. 6C is a front view with the mobile terminal in FIG. 6A closed.

The mobile terminals of FIGS. 2A to 2F can have a third display unit (not shown) outside the second body 300. In this respect, however, in terms of power consumption, it may not be desirable that the mobile terminals have the external display unit.

The mobile terminal in accordance with the present invention can simultaneously execute a plurality of tasks through the first and second display units 30 and 40, and in this case, while the user processes a task in one display unit, the other display unit is maintained (remains) in a non-active state. Namely, while the user processes a task in the first display unit 30, the controller 20 of the mobile terminal can activate the first display unit 30 and can deactivate the second display unit 40. Conversely, when the user processes a task in the second display unit 40, the controller can deactivate the first display unit 30 and can activate the second display unit 40.

In order for the user to select the display units 30 and 40, a display unit selecting means can be provided, and as the display unit selecting means, a button of a keypad can be used or a select button (soft key) can be additionally provided in the mobile terminal.

In this embodiment, as shown in FIG. 6B, an up select button 117a and a down select button 117b as the display unit selecting means (or an activation switching unit) can be additionally provided in the mobile terminal.

When the user presses the up select button 117a, the first display unit 30 can be activated and a signal inputted through the input unit 10 is inputted for an operation executed on the first display unit 30.

When the user presses the down select button 117b, the second display unit 40 can be activated, and a signal inputted through the input unit 10 is inputted for an operation executed on the second display unit 40.

When the user depresses the up select button 117a or the down select button 117b for a prolonged period of time (e.g., 3 seconds or longer), the mobile terminal 100 may perform display switching (refer to the second embodiment of the present invention).

If the first and second display units 30 and 40 are implemented as a inputtable display unit (e.g., a touch screen), the user can perform the above-described operations by simply touching the screen without using the display unit selecting means 117a and 117b.

The display unit selecting means can be operated in the same manner when one display unit having the plurality of regions is provided.

The 'plurality of simultaneously executed tasks' have the same but independent relationships with each other, and the 'tasks' refer to typically provided functions with the following types:

(1) Online services (e.g., online games, wireless Internet services, VOD (Video On Demand) services, file downloading, or the like)

(2) message services (e.g., chatting, instant messenger functions, short message services, multimedia messages, e-mail, or the like)

(3) call services (e.g., voice communications, video communications, or the like)

(4) functions of taking images (e.g., video (moving picture), still image, etc.)

(5) various supplementary functions (e.g., scheduler, phone book searching, calculator, writing a memo, recording communication contents (recording sounds and images), setting a terminal state, searching calendar dates, displaying world time functions, setting alarms (or morning call features), reproducing videos or music files, or the like).

The mobile terminals in accordance with the present invention can operate as follows.

FIG. 7 is a flow chart illustrating exemplary the processes of a display method for the mobile terminal in accordance with the present invention, and FIGS. 8A to 11 show exemplary first and second display units of the mobile terminal in accordance with the present invention.

As shown in FIG. 7, the mobile terminal receives user instructions through the input unit 10 and executes one or more tasks in turn according to the inputted instructions. And, the controller 20 displays the executed tasks on the first and second display units 30 and 40 (steps S10 and S20).

Thereafter, when a new instruction from the user is inputted through the input unit 10, the controller determines the appropriate display unit for performing the instruction. If the inputted instruction is to be displayed on a currently deactivated display unit, the controller 20 activates the currently deactivated display unit and processes the corresponding operation (step S30).

Figure 8A:
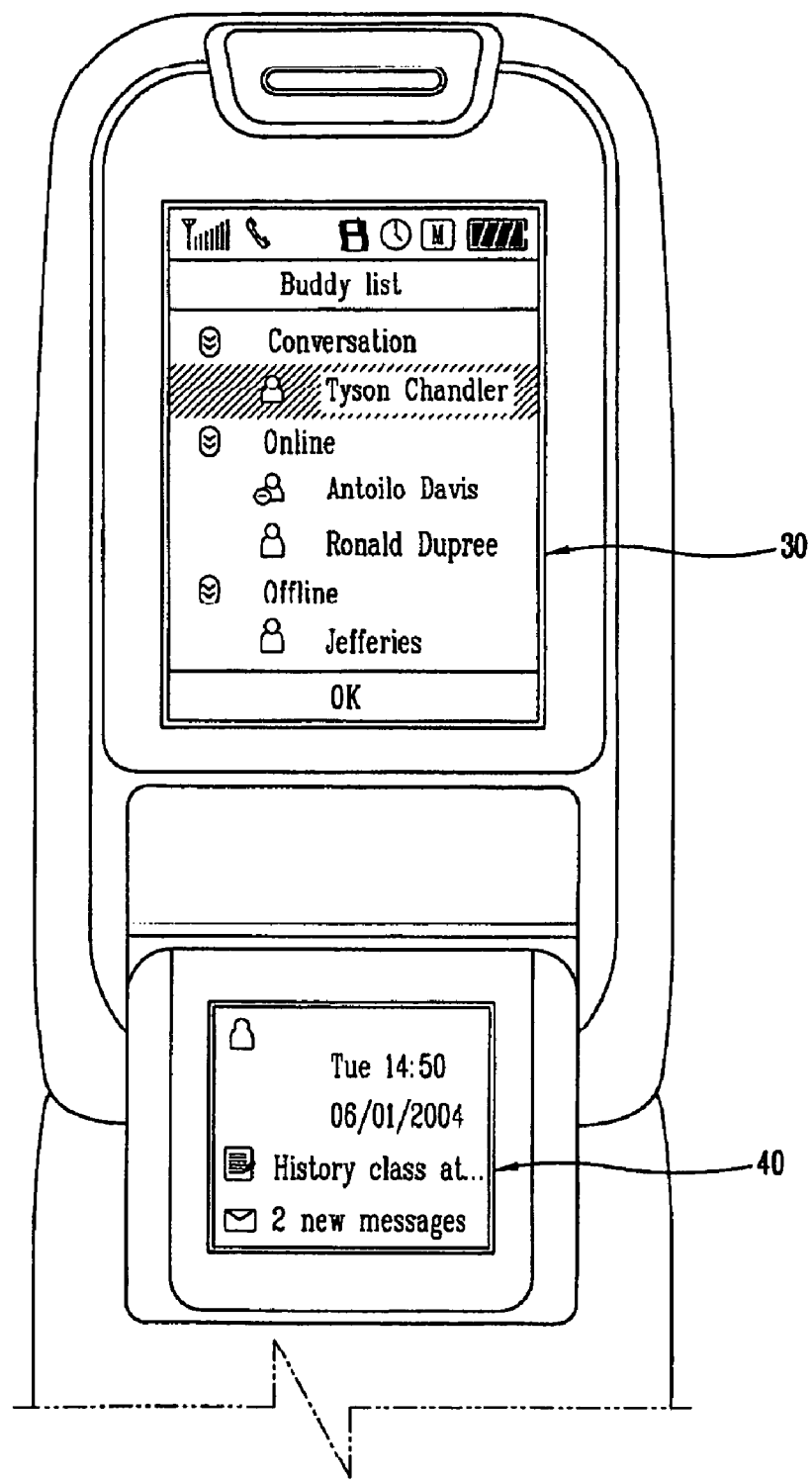
FIGS. 8A to 8C show exemplary display units of a mobile terminal in accordance with a first embodiment of the present invention.
Figure 8B:
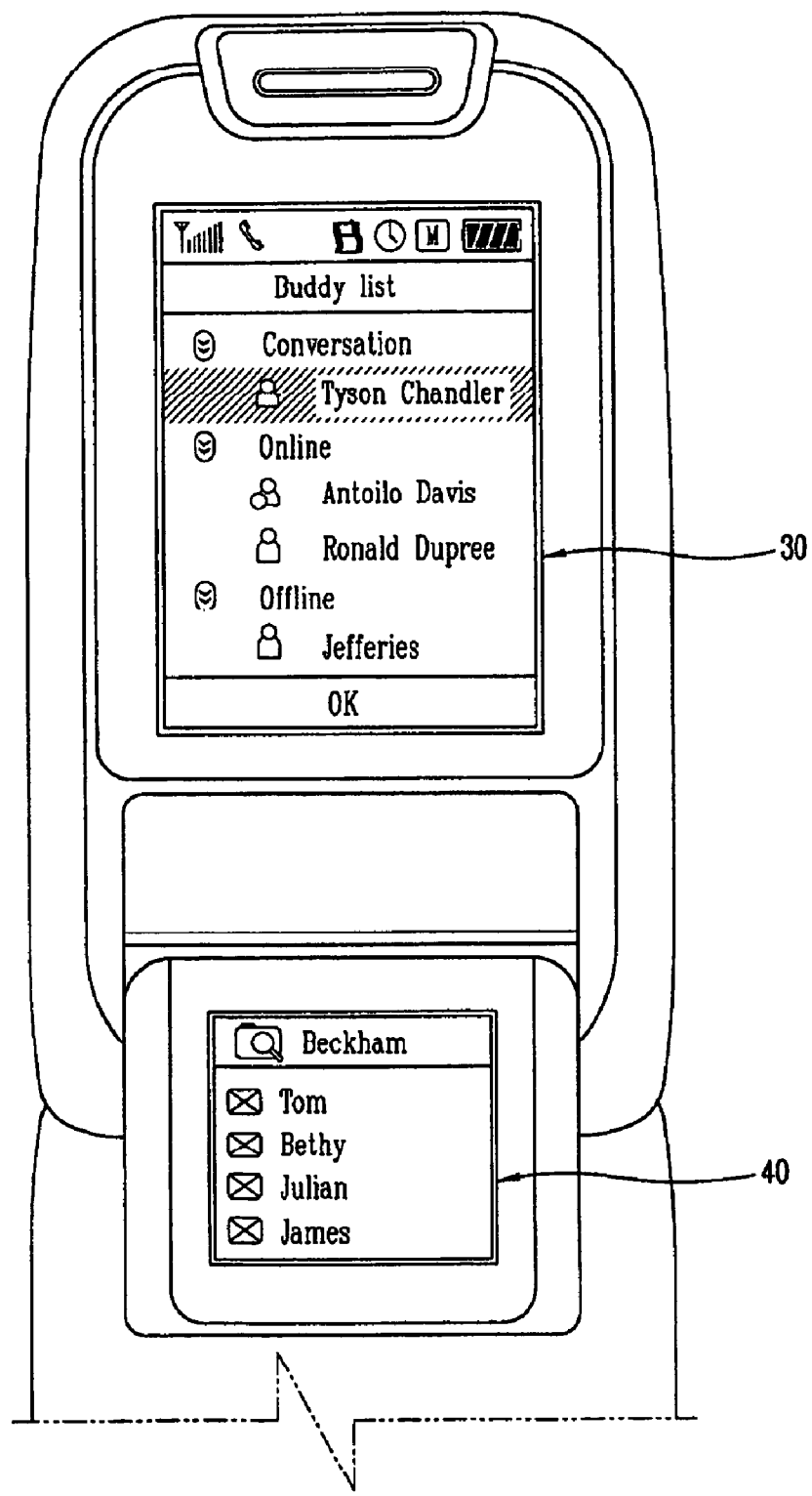
Figure 8C:
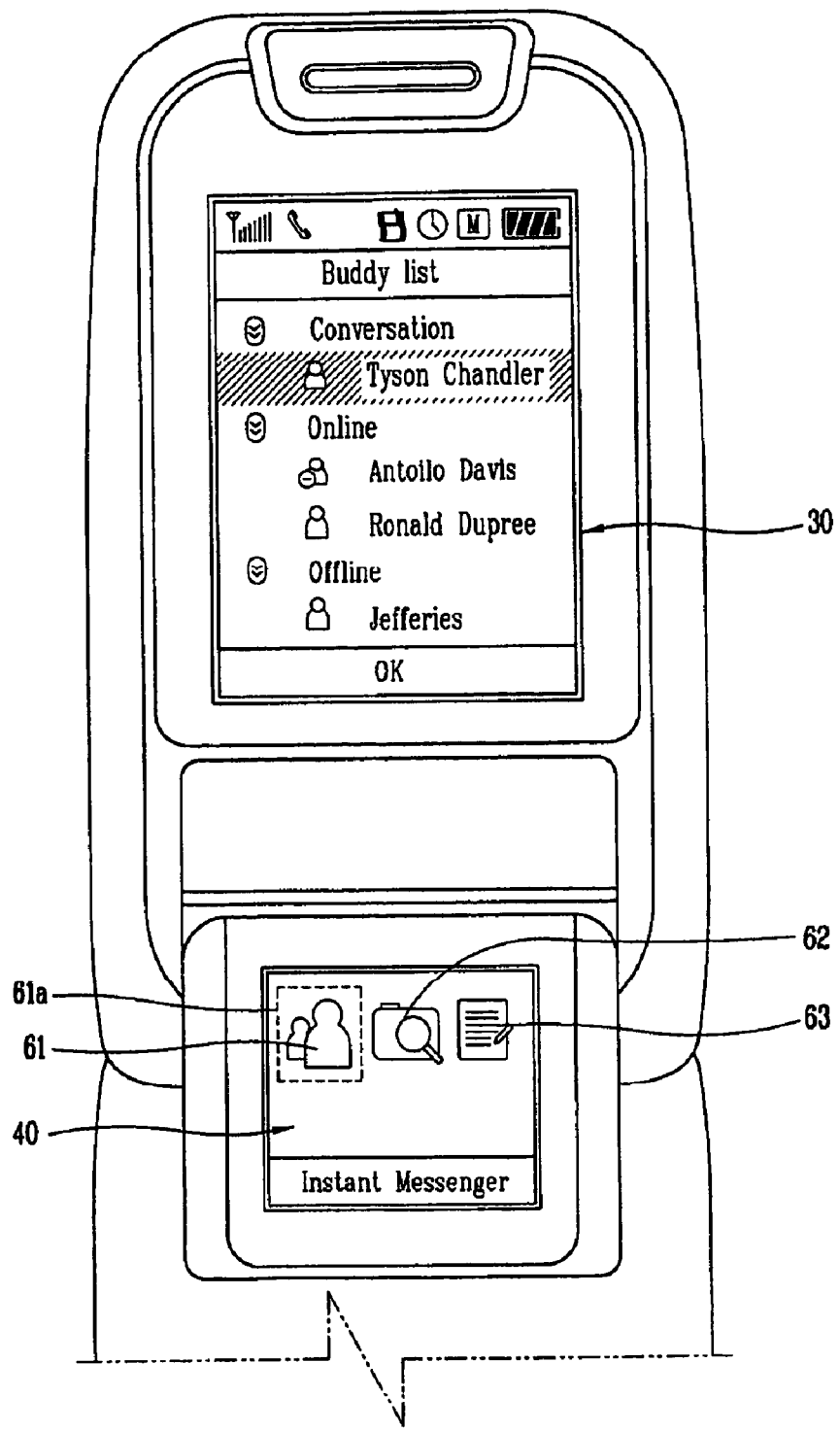

FIGS. 8A to 8C show exemplary display units of the mobile terminal in accordance with a first embodiment of the present invention.

First, FIG. 8A shows a case where the mobile terminal 100 executes only one operation. As shown in FIG. 8A, the first display unit 30 displays buddies registered in an instant messenger function, showing the person with whom the user is talking, indicating who is in an online state and who is in an offline state, while the second display unit 40 displays a standby screen.

As shown in FIG. 8A, when the mobile terminal 100 executes one task through one screen, the controller 20 can maintain the other screen in a standby state. Namely, when the first display unit 40 displays an executed task (e.g., instant messenger), the controller 20 maintains the second display unit 30 in the standby state, and if the second display unit 40 displays an executed task (e.g., instant messenger), the controller maintains the first display unit 30 in the standby state.

Table 1 shows the features related to the embodiment of FIG. 8A.

TABLE 1

| List of tasks | execution | First display unit | Second display unit |
|---|---|---|---|
| Task 'A' | ○ | Displays task 'A' (e.g., instant messenger) | Is maintained in a standby state |
| Task 'B' | X | | |
| Task 'C' | X | | |
| Task 'D' | X | | |
| Task 'E' | X | | |
| . | . | | |
| . | . | | |
| Task 'N' | X | | |

FIG. 8B shows a case where the mobile terminal 100 simultaneously executes two tasks (e.g., instant messenger and phone book searching). As shown in FIG. 8B, the first display unit 30 displays an instant messenger window like the case shown in FIG. 8A, and the second display unit 40 displays a phone book search window.

The embodiment of FIG. 8B shows a case where the user searches a phone number of a person while executing the instant messenger function. Namely, in the present invention, the mobile terminal 100 can display one specific task (e.g., the instant messenger) through the first display unit 30 and simultaneously can display another task (e.g., phone book searching) through the second display unit 40. That is, the mobile terminal 100 allows the user to process two or more independent tasks simultaneously.

Table 2 shows features related to the embodiment of FIG. 8B.

TABLE 2

| List of tasks | execution | First display unit | Second display unit |
|---|---|---|---|
| Task 'A' | ○ | Displays task 'A' (instant messenger) | Displays task 'D' (phone book searching) |
| Task 'B' | X | | |
| Task 'C' | ○ | | |
| Task 'D' | X | | |
| Task 'E' | X | | |
| . | . | | |
| . | . | | |
| . | . | | |
| Task 'N' | X | | |

FIG. 8C shows a case where three tasks (e.g., instant messenger, phone book searching, and schedule management) are executed simultaneously. As shown in FIG. 8C, the first display unit 30 displays an instant messenger window like the case as shown in FIG. 8A, and the second display unit 40 displays icons (or other graphics) 61~63 of the tasks being currently executed (instant messenger, phone book searching, and schedule management).

When a specific button (or key) is pressed (or activated) to make the icons 61~63 of the tasks being executed appear on the display unit 30 or 40, the controller 20 detects this through the input unit 10 and displays the icons 61~63 of the instant messenger function, phone book searching and schedule management either on the first display unit 30 or on the second display unit 40. Thereafter, when the user selects a specific icon by operating direction keys (←, ↑, →, ↓), the controller displays a corresponding task window on the second display unit 40. Though FIG. 8C shows the task windows displayed on the second display unit 40, the user can display them on the first display unit 30.

Table 3 shows features related to the embodiment of FIG. 8C.

TABLE 3

| List of tasks | execution | First display unit | Second display unit |
|---|---|---|---|
| Task 'A' | ○ | Displays task 'A' (instant messenger) | Displays one of remaining tasks (tasks 'C' and 'D'), and in this case, a corresponding icon of the task 'A' being executed on the first display unit 30 is shown to be brighter in its background color (61a) than other icons so as to be discriminated from other icons (62, 63) |
| Task 'B' | X | | |
| Task 'C' | ○ | | |
| Task 'D' | ○ | | |
| Task 'E' | X | | |
| . | . | | |
| . | . | | |
| . | . | | |
| Task 'N' | X | | |

Figure 9:
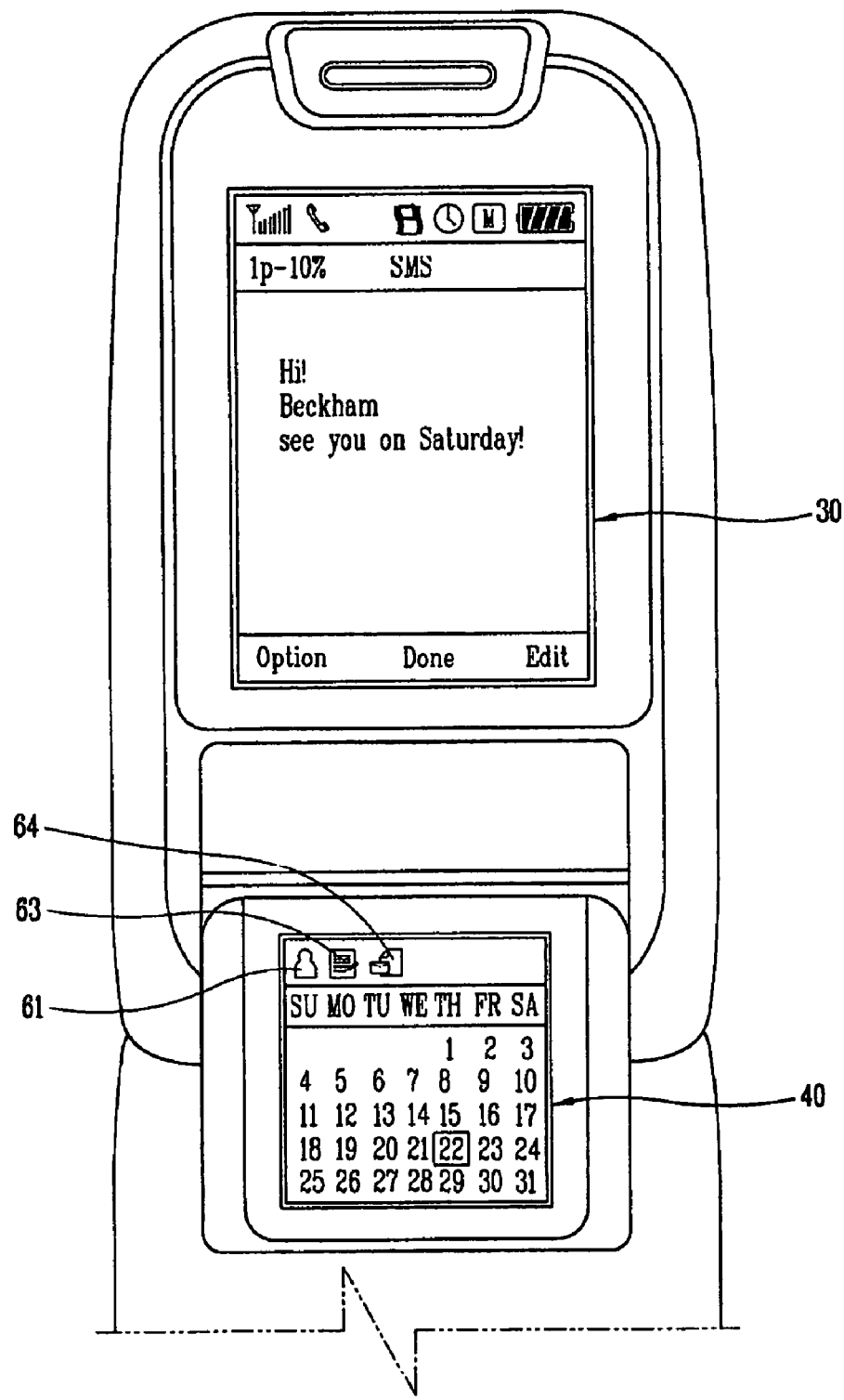
FIG. 9 shows exemplary display units (prior to display switching) of a mobile terminal in accordance with a second embodiment of the present invention.
Figure 10:
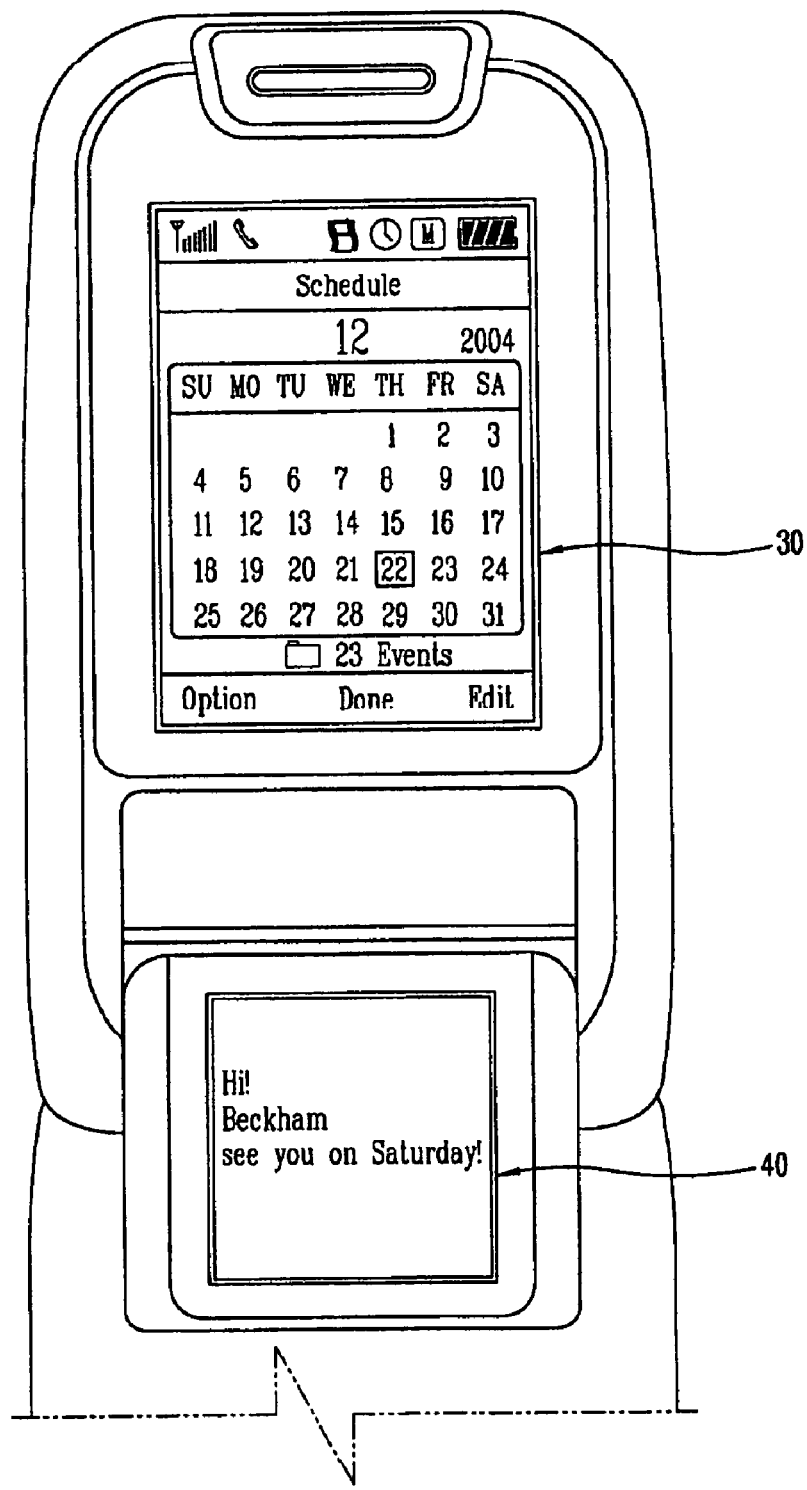
FIG. 10 shows exemplary display units (after display switching) of the mobile terminal in accordance with the second embodiment of the present invention.

FIGS. 9 and 10 show the state of exemplary display units (before and after display switching) of a mobile terminal in accordance with a second embodiment of the present invention.

In the second embodiment of the present invention, the mobile terminal 100 exchanges the displaying of a task (e.g., short message input) of the first display unit 30 and a task (e.g., schedule management) of the second display unit 40, when the user presses a certain button or activates such function in another manner.

As shown in FIG. 9, the mobile terminal 100 displays a short message input window on the first display unit 30 and schedule management on the second display unit 40. When the user instructs to the switching of displaying the tasks, the controller 20 displays mutually exchanged tasks of the first and second displays 30 and 40.

The display switching can be performed when the user presses the up select button 117a or the down select button 117b for a certain time (e.g., 3 seconds) or longer or when the user simultaneously presses the up select button 117a and the down select button 117b for a certain time (e.g., 3 seconds) or longer.

In FIG. 9, icons 61, 63 and 65 shown at an upper portion of the second display unit 40 indicate the tasks being currently executed by the mobile terminal 100. Through the icons 61, 63 and 64, the user can recognize the tasks being currently executed in the mobile terminal 100.

Table 4 shows the features related to the second embodiment of the present invention.

TABLE 4

| List of tasks | Execution | First display unit | Second display unit |
|---|---|---|---|
| Task 'A' | ○ | Displays task 'B' (e.g., short message), and in this case, when the user instructs display switching, the first display unit displays task 'D' (e.g., schedule management) | Displays task 'D' (e.g., schedule management), and in this case, when the user instructs display switching, the second display unit displays task 'B' (e.g., short message) |
| Task 'B' | ○ | | |
| Task 'C' | X | | |
| Task 'D' | ○ | | |
| Task 'E' | X | | |
| . | . | | |
| . | . | | |
| . | . | | |
| Task 'N' | X | | |

Figure 11:
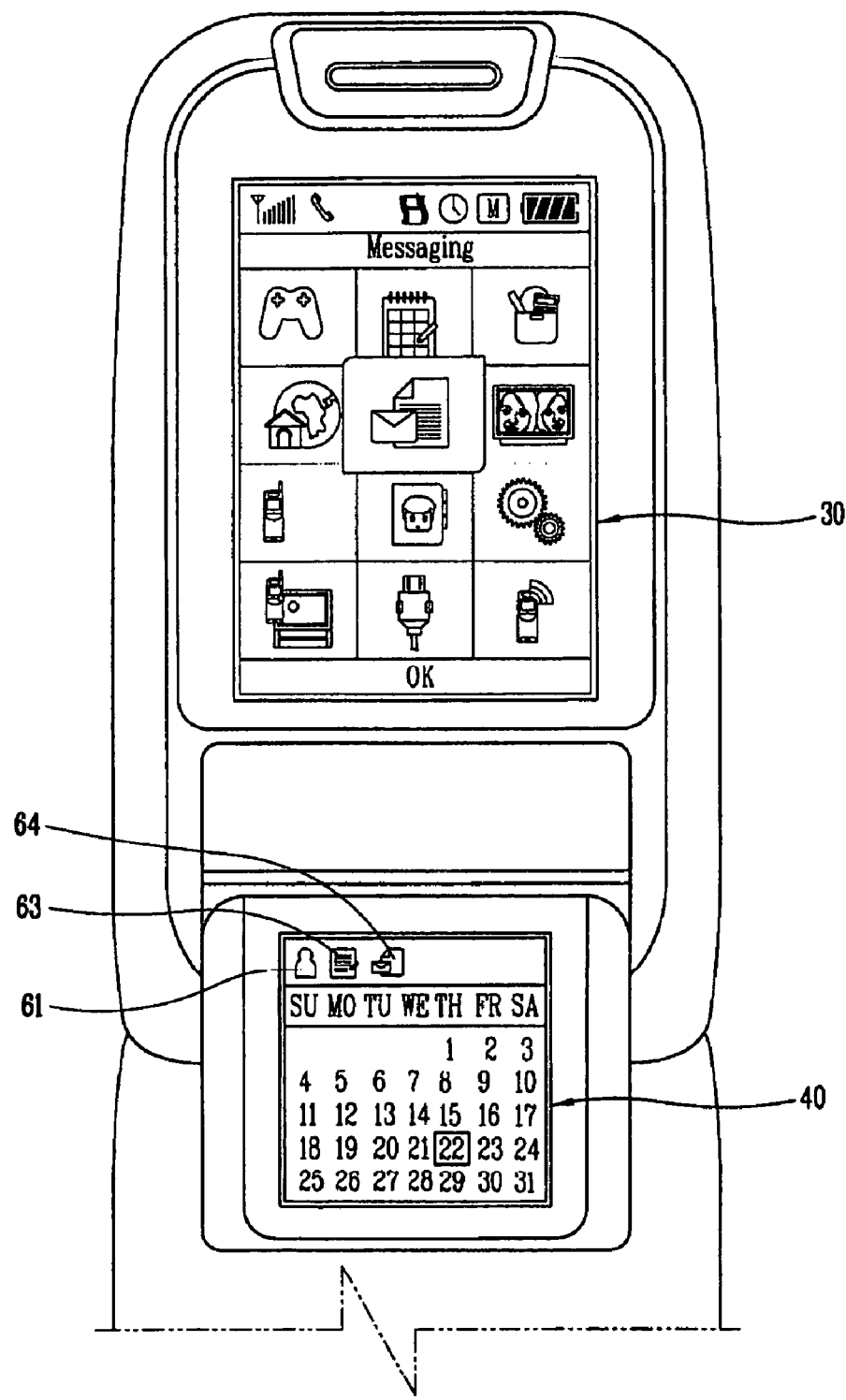
FIG. 11 shows exemplary display units of a mobile terminal in accordance with a third embodiment of the present invention.

FIG. 11 shows exemplary display units of a mobile terminal in accordance with a third embodiment of the present invention.

When the user activates the first display unit 30 by pressing a certain button (or other activation means) and presses a specific key (e.g., menu key (or other activation means) for additionally executing a new task, as shown in FIG. 11, the controller 20 displays menu items on the first display unit 30.

Thereafter, when the user selects one of icons of menu items, the controller 20 executes a task corresponding to the selected icon and newly adds the selected icon to a list of tasks being currently executed of the second display unit 40.

The list of tasks being currently executed is displayed as an icon type (or other graphics) at an upper portion of the second display unit, and the user can recognize through the icons that the instant messenger 61, the schedule management 63 and the short message input 64 are being currently executed.

Table 5 shows the features related to the third embodiment of the present invention.

TABLE 5

| List of tasks | execution | First display unit | Second display unit |
|---|---|---|---|
| Task 'A' | ○ | Displays menu items for additionally executing a new task (the user selectively executes one of icons of menu items) | Displays task 'D' (e.g., schedule management) |
| Task 'B' | X | | |
| Task 'C' | X | | |
| Task 'D' | ○ | | |
| Task 'E' | X | | |
| . | . | | |
| . | . | | |
| . | . | | |
| Task 'N' | X | | |

As so far described, the display apparatus and method for a mobile terminal in accordance with the present invention has the following advantages.

That is, the mobile terminal can simultaneously process a plurality of tasks through a plurality of display units to allow the user to substantially perform multitasking.

Because the mobile terminal has a plurality of display units which can independently perform displaying, the user can simultaneously process tasks such as instant messenger function and video reproducing by using the display units.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A display apparatus for a mobile terminal, the apparatus comprising:
    an input unit for receiving inputs including a first input and a second input, the first input initiating execution of a first task in one of a plurality of display units and the second input initiating execution of a second task in another one of the plurality of display units;
    a controller for executing at least two different tasks, including the first and second tasks, simultaneously in response to the inputs;
    a first display unit for displaying the first task executed by the controller according to the first input; and
    a second display unit for displaying the second task executed by the controller according to the second input, the second display unit further displaying a list of icons, all icons in the list respectively corresponding to tasks that are being executed concurrently by the controller and the list of icons including a first icon, which corresponds to the first task and a second icon, which corresponds to the second task, at a defined portion of the second display unit displaying the second task being executed, wherein the displayed second task occupies a majority of a display area on the second display unit that is substantially larger than the defined portion of the second display unit,
    wherein the first task is displayed on the first display unit and the second task is displayed on the second display unit at the same time, and the controller is configured to switch displaying of the first and second display units in response to an input for display switching such that the first task is displayed on the second display unit and the second task is displayed on the first display unit in response to the input for display switching,
    wherein one of the first and second display units displays a standby screen when only one of the first and second tasks is executed on another one of the first and second display units, the standby screen comprising information that is displayed when the mobile terminal is not in use,
    wherein the controller is further configured to generate additional icons to be included in the list of icons displayed on the second display unit when more than two tasks are executed such that the first icon, the second icon, and the additional icons correspond to the first, second, and additional tasks being executed, respectively, while only two of the first, second, and additional tasks are displayed on the first and second display units,
    wherein all icons in the list of icons are different from each other and one of the different icons in the list of icons, which corresponds to a task that is displayed on the first display unit, is displayed brighter than remaining icons in the list while the corresponding task is displayed on the first display unit to indicate that the task corresponding to the brighter icon is being displayed on the first display unit,
    wherein the controller is further configured to cause displaying of a list of tasks which can be executed on the first or second display unit in response to an input for displaying the list of tasks, and add a new icon to the list of icons when a new task is selected from the list of tasks, the new icon corresponding to the selected new task, and
    wherein the controller is further configured to cause displaying of a specific task, which corresponds to a specific icon in the list of icons, on the second display unit when the specific icon is selected from the list of icons while the second task is being executed on the second display unit, the second task displayed on the second display unit being replaced by the specific task upon selection of the specific icon.

2. The apparatus of claim 1, wherein the controller deactivates a currently activated one of the first display unit or second display unit and activates a previously deactivated one of the first display unit or second display unit in response to an input for switching of an activated display unit.

3. The apparatus of claim 2, wherein the first and second display units comprise touch screens and the deactivated first display unit is activated upon receiving a first touch input via the first display unit and the deactivated second display unit is activated upon receiving a second touch input via the second display unit.

4. The apparatus of claim 1, wherein the mobile terminal includes first and second bodies, and the second body rotates with respect to the first body to be in a closed or open configuration.

5. The apparatus of claim 4, wherein the first and second display units are formed on the second body.

6. The apparatus of claim 5, wherein the first and second display units are not visible in the closed configuration and are visible in the open configuration.

7. The apparatus of claim 4, wherein the first and second display units are separately formed on the first and second bodies, respectively.

8. The apparatus of claim 7, wherein display screens of the first and second display units are angled with respect to the first body and are on the same plane in the open configuration.

9. The apparatus of claim 1, wherein the mobile terminal includes first and second bodies, a rear surface of the first body substantially covering a front surface of the second body in a closed configuration, and the first body slides upward or downward with respect to the second body to be in an open configuration, exposing at least a portion of the front surface of the second body in the open configuration.

10. The apparatus of claim 9, wherein the first and second display units are formed on the first body and exposed in both the closed and open configuration.

11. The apparatus of claim 9, wherein the first and second display units are separately formed on the first and second bodies, respectively, such that only the first display unit is exposed in the closed configuration and both the first and second display units are exposed in the open configuration, the second display unit of the second body facing the rear surface of the first body in the closed configuration.

12. The apparatus of claim 11, wherein the second display unit is formed on a lower portion of the second body such that the second display unit is exposed if the first body is slid upward with respect to the second body, wherein an area of the lower portion of the second body is substantially the same as or smaller than an area of an upper portion of the second body that remains covered by the rear surface of the first body in the open configuration.

13. The apparatus of claim 11, wherein the second display unit is formed on an upper portion of the second body such that the second display unit is exposed if the first body is slid downward with respect to the second body, wherein an area of the upper portion of the second body is substantially the same as or smaller than an area of an lower portion of the second body that remains covered by the rear surface of the first body in the open configuration.

14. The apparatus of claim 1, wherein the controller is further configured to cause displaying of menu items with at least a second icon on the first or second display unit in response to an input for execution of at least a third task, and execute the at least third task corresponding to the at least second icon and add the at least second icon on a list of tasks currently executed upon selection of the at least second icon from the menu items.

15. The apparatus of claim 1, further comprising:
a display unit selecting means for selecting the first display unit or the second display unit.

16. The apparatus of claim 1, wherein the at least two tasks are independent from each other.

17. The apparatus of claim 1, wherein the first task and the second task are unrelated tasks.

18. The apparatus of claim 1, wherein the first display unit and the second display unit are viewable from one point and operate independently from each other.

19. The apparatus of claim 1, wherein the controller is further configured to cause displaying of a third task on the first display unit or the second display unit upon receiving a third input for selecting an icon corresponding to the third task among the at least one icon displayed on the second display unit, and cause displaying of the first task on the first display unit or displaying of the second task on the second display unit upon receiving a fourth input for ending the third task.

20. The apparatus of claim 1, wherein the input unit receives the second input while the first task is displayed on the first display unit and the controller displays the second task on the second display unit in response to the second input.

21. The apparatus of claim 20, wherein the first task comprises communication, the first display unit displaying information related to the communication, and the second task comprises searching in a contact list, the second display unit displaying the contact list such that the contact list is searched from the contact list displayed on the second display unit while the communication is processed and the information related to the communication is displayed on the first display unit.

22. The apparatus of claim 20, wherein the first task comprises communication, the first display unit displaying information related to the communication, and the second task comprises schedule management, the second display unit displaying a scheduler such that schedule is managed via the scheduler displayed on the second display unit while the communication is processed and the information related to the communication is displayed on the first display unit.

23. The apparatus of claim 22, wherein the communication comprises a messaging service.

24. The apparatus of claim 20, wherein the first task comprises video communication, the first display unit displaying information related to the video communication, and the second task comprises a memo function, the second display unit comprising a touch screen and displaying a screen for receiving text related to a memo.

25. The apparatus of claim 1, wherein the first task comprises video reproducing and the second task comprises a instant messenger function, and the instant messenger function is performed on the second display unit while the video reproducing is performed on the first display unit.

26. The apparatus of claim 1, wherein the controller determines on which one of the first and second display units the first task or the second task will be performed and displayed upon receiving the first input or the second input.

27. A display method for a mobile terminal, the method comprising:
receiving inputs, including a first input and a second input, via an input unit of the mobile terminal, the first input initiating execution of a first task in one of a plurality of display units and the second input initiating execution of a second task in another one of the plurality of display units;
executing at least two different tasks, including the first and second tasks, simultaneously according to the received inputs;
activating a first display unit of the mobile terminal in response to the received first input and activating a second display unit of the mobile terminal in response to the received second input;
displaying, by the first display unit, the first task being executed according to the first input;
performing the first task on the first display unit;
displaying, by the second display unit, the second task being executed according to the second input;
performing the second task on the second display unit;
displaying a list of icons, all icons in the list respectively corresponding to tasks that are being executed concurrently and the list of icons including a first icon, which corresponds to the first task, and a second icon, which corresponds to the second task, at a defined portion of the second display unit displaying the second task being executed, wherein the displayed second task occupies a majority of a display area on the second display unit that is substantially larger than the defined portion of the second display unit;
processing operations of the activated first display unit and the activated second display unit independently;
switching displaying of the first and second display units in response to an input for display switching that is received while the first task is displayed on the first display unit and the second task is displayed on the second display unit at the same time such that the first task is displayed on the second display unit and the second task is displayed on the first display unit after the displaying of the first and second display units is switched in response to the input for display switching, wherein one of the first and second display units displays a standby screen when only one of the first and second tasks is executed on another one of the first and second display units, the standby screen comprising information that is displayed when the mobile terminal is not in use;
generating additional icons to be included in the list of icons displayed on the second display unit when more than two tasks are executed such that the first icon, the second icon, and the additional icons correspond to the first, second, and additional tasks being executed, respectively, while only two of the first, second, and additional tasks are displayed on the first and second display units, wherein all icons in the list of icons are different from each other and one of the different icons in the list of icons, which corresponds to a task that is displayed on the first display unit, is displayed brighter than remaining icons in the list while the corresponding task is displayed on the first display unit to indicate that the task corresponding to the brighter icon is being displayed on the first display unit;

displaying a list of tasks which can be executed on the first or second display unit in response to an input for displaying the list of tasks, and adding a new icon to the list of icons when a new task is selected from the list of tasks, the new icon corresponding to the selected new task; and displaying a specific task, which corresponds to a specific icon in the list of icons, on the second display unit when the specific icon is selected from the list of icons while the second task is being executed on the second display unit, the second task displayed on the second display unit being replaced by the specific task upon selection of the specific icon.

28. The method of claim 27, wherein one of the first display unit or second display unit is maintained in a standby state upon the mobile terminal finishing the simultaneous execution of the at least two tasks and executing only one of the at least two tasks.

29. The method of claim 27, wherein the at least two tasks are displayed on the first and second display units independently while being executed simultaneously.

30. The method of claim 29, further comprising:
displaying, by the first display unit, the second task in response to an input for display switching; and
displaying, by the second display unit, the first task in response to the input for displaying switching.

31. The method of claim 27, further comprising:
deactivating one of the first display unit or second display unit in response to a third input for deactivating the one of the first display unit or second display unit; and
activating the deactivated one of the first display unit or second display unit and deactivating the activated first display unit or second display unit in response to a fourth input for switching of the first and second display units.

32. The method of claim 31, wherein the first and second display units comprise touch screens and the method further comprises receiving a touch input such that the deactivated first display unit is activated upon receiving a first touch input via the first display unit and the deactivated second display unit is activated upon receiving a second touch input via the second display unit.

33. The method of claim 27, further comprising:
determining on which one of the first and second display units the first task or the second task will be performed and displayed upon receiving the first input or the second input.

34. A mobile terminal, comprising:
an input unit for receiving inputs including a first input and a second input, the first input initiating execution of a first task in one of a plurality of display units and the second input initiating execution of a second task in another one of the plurality of display units;

a controller for simultaneously executing two or more independent tasks, including the first and second tasks, in response to the inputs;

a first display unit for displaying the first task executed by the controller according to the first input; and a second display unit, which is viewable simultaneously with the first display unit from one point, for displaying the second task executed by the controller according to the second input, the second display unit further displaying a list of icons, all icons in the list respectively corresponding to tasks that are being executed concurrently by the controller and the list of icons including a first icon, which corresponds to the first task being executed and displayed on the first display unit, at a defined portion of the second display unit displaying the second task being executed, wherein the displayed second task occupies a majority of a display area on the second display unit that is substantially larger than the defined portion of the second display unit, wherein the controller determines that the first task will be performed and displayed on the first display unit upon receiving the first input and that the second task will be performed and displayed on the second display unit upon receiving the second input, wherein the first task is performed and displayed on the first display unit and the second task is performed and displayed on the second display unit at the same time upon determination by the controller, wherein the controller is configured to switch displaying of the first and second display units in response to an input for display switching such that the first task is displayed on the second display unit and the second task is displayed on the first display unit in response to the input for display switching, and wherein one of the first and second display units displays a standby screen when only one of the first and second tasks is executed on another one of the first and second display units, the standby screen comprising information that is displayed when the mobile terminal is not in use, wherein the controller is further configured to generate additional icons to be included in the list of icons displayed on the second display unit when more than two tasks are executed such that the first icon, the second icon, and the additional icons correspond to the first, second, and additional tasks being executed, respectively, while only two of the first, second, and additional tasks are displayed on the first and second display units, wherein all icons in the list of icons are different from each other and one of the different icons in the list of icons, which corresponds to a task that is displayed on the first display unit, is displayed brighter than remaining icons in the list while the corresponding task is displayed on the first display unit to indicate that the task corresponding to the brighter icon is being displayed on the first display unit, wherein the second display unit displays a list of tasks which can be executed in response to an input for displaying the list of tasks, and the controller is further configured to add a new icon to the list of icons when a new task is selected from the list of tasks, the new icon corresponding to the selected new task, and wherein the controller is further configured to cause displaying of a specific task, which corresponds to a specific icon in the list of icons, on the second display unit when the specific icon is selected from the list of icons while the second task is being executed on the second display unit, the second task displayed on the second display unit being replaced by the specific task upon selection of the specific icon.

35. The terminal of claim 34, wherein the second display unit displays the list of the tasks at a lower end portion of the second display unit.

36. The terminal of claim 34, wherein the second display unit displays the list of the tasks in a pop-up format.

37. The terminal of claim 34, wherein the controller displays the new task selected from the list of tasks on the first display unit.

38. The terminal of claim 34, further comprising:

a display unit selecting means configured to select the first display unit or the second display unit.

* * * * *